United States Patent
Tong

(10) Patent No.: US 9,602,410 B2
(45) Date of Patent: Mar. 21, 2017

(54) METHOD, DEVICE, AND SYSTEM FOR PROCESSING ACKNOWLEDGEMENT PACKET

(71) Applicant: Huawei Technologies Co., Ltd., Shenzhen (CN)

(72) Inventor: Changhua Tong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 154 days.

(21) Appl. No.: 14/491,744

(22) Filed: Sep. 19, 2014

(65) Prior Publication Data
US 2015/0023167 A1    Jan. 22, 2015

Related U.S. Application Data

(63) Continuation of application No. PCT/CN2012/087791, filed on Dec. 28, 2012.

(30) Foreign Application Priority Data

Mar. 21, 2012    (WO) ................ PCT/CN2012/072726

(51) Int. Cl.
*H04L 12/801* (2013.01)
*H04L 1/18* (2006.01)
*H04L 12/823* (2013.01)
*H04L 29/06* (2006.01)

(52) U.S. Cl.
CPC ............ *H04L 47/12* (2013.01); *H04L 1/1854* (2013.01); *H04L 47/11* (2013.01); *H04L 47/323* (2013.01); *H04L 47/34* (2013.01); *H04L 69/163* (2013.01)

(58) Field of Classification Search
CPC ..................................................... H04L 47/12
See application file for complete search history.

(56) References Cited

U.S. PATENT DOCUMENTS 6,208,653 B1 * 3/2001 Ogawa ............... H04Q 11/0478
                                                                370/229
6,215,769 B1 * 4/2001 Ghani .................. H04L 1/1809
                                                                370/230
6,252,851 B1    6/2001 Siu et al.
(Continued)

FOREIGN PATENT DOCUMENTS

CN          1416238 A       5/2003
CN          1833422 A       9/2006
(Continued)

*Primary Examiner* — Brian D Nguyen
*Assistant Examiner* — Toan Nguyen
(74) *Attorney, Agent, or Firm* — Slater Matsil, LLP

(57) ABSTRACT

Embodiments of the present application disclose a method, a device, and a system for processing an acknowledgement packet, and relate to the field of communications technologies. A sending period and a data volume threshold are set on a data transmission device, and the data volume threshold is used to control acknowledgement packets sent by the data transmission device to a data sending end within each sending period, so that a total data volume that is reflected by all the sent acknowledgement packets as having been acknowledged by a data receiving end is within the data volume threshold. Thereby a problem of sending a large quantity of packets by the data receiving end is solved.

18 Claims, 12 Drawing Sheets

(56) References Cited

U.S. PATENT DOCUMENTS

| | | | |
|---|---|---|---|
| 7,000,021 B1* | 2/2006 | Radhakrishnan | H04L 1/1614 |
| | | | 370/394 |
| 2005/0013246 A1* | 1/2005 | Miyake | H04L 1/0002 |
| | | | 370/230 |
| 2006/0056300 A1 | 3/2006 | Tamura et al. | |
| 2006/0176862 A1* | 8/2006 | Ishimori | H04L 1/1848 |
| | | | 370/338 |
| 2007/0008884 A1 | 1/2007 | Tang | |
| 2007/0291782 A1 | 12/2007 | Basso et al. | |
| 2009/0190604 A1 | 7/2009 | Pullen | |
| 2009/0252162 A1 | 10/2009 | Ohnaka | |

FOREIGN PATENT DOCUMENTS

| | | |
|---|---|---|
| CN | 1989721 A | 6/2007 |
| CN | 101090338 A | 12/2007 |
| CN | 101552657 A | 10/2009 |
| JP | 2007535878 A | 12/2007 |
| JP | 2010056939 A | 3/2010 |
| JP | 2010516183 A | 5/2010 |
| JP | 2011193046 A | 9/2011 |
| WO | 0021233 A2 | 4/2000 |
| WO | 2005006673 A1 | 1/2005 |
| WO | 2005104796 A2 | 11/2005 |
| WO | 2006027672 A2 | 3/2006 |
| WO | 2008085910 A1 | 7/2008 |

* cited by examiner

METHOD, DEVICE, AND SYSTEM FOR PROCESSING ACKNOWLEDGEMENT PACKET

This application is a continuation of International Application No. PCT/CN2012/087791, filed on Dec. 28, 2012, which claims priority to International Patent Application No. PCT/CN2012/072726, filed on Mar. 21, 2012, both of which are hereby incorporated by reference in their entireties.

TECHNICAL FIELD

The present application relates to the field of communications technologies and, in particular embodiments, to a method, a device, and a system for processing an acknowledgement packet.

BACKGROUND

The Transmission Control Protocol (TCP for short) provides a connection-oriented byte stream service, where a terminal and a server may normally send data to each other after a connection is established, and data transmission performed by using the TCP protocol employs a packet acknowledgement mechanism and a retransmission function. In a downlink TCP service, the server sends a packet to the terminal, the terminal returns an acknowledgement packet to the server after receiving the packet, and the server sends a remaining packet according to the received acknowledgement packet. Due to advantages of the TCP service, the use of the TCP is gradually extending beyond traditional wired transmission services and starts to be seen in wireless transmission services.

In the prior art, the Transmission Control Protocol/Internet Protocol (TCP/IP for short) was developed and designed for wired transmission. After TCP/IP is introduced to a wireless system, for example, a long term evolution (Long Term Evolution, LTE for short) system, limitations of wireless communication result in a fluctuation of air-interface signals, and the server may not receive, within several milliseconds or hundreds of milliseconds, any acknowledgement packet returned by the terminal. After the fluctuation of air-interface signals disappears, the server receives a large quantity of acknowledgement packets within a short period of time. Consequently, in the prior art, lack of differentiated processing upon arrival of a new acknowledgement packet may lead to a problem that the server delivers a large quantity of packets to the terminal according to the large quantity of received acknowledgement packets. Similarly, for uplink data transmission, the same problem may also exist when the terminal sends a packet to the server.

SUMMARY

Embodiments of the present application provide a method for processing an acknowledgement packet, a data transmission device, and a communications system, so as to solve a technical problem of a burst of a large quantity of packets.

According to a first aspect, an embodiment of the present application provides a method for processing an acknowledgement packet, including sending an acknowledgement packet; updating a total data volume that is reflected by all sent acknowledgement packets within a current sending period as having been acknowledged by a data receiving end; comparing the updated total data volume with a data volume threshold; and controlling, according to a result of the comparison, whether to continue to send an acknowledgement packet within the current sending period.

According to a second aspect, an embodiment of the present application provides a data transmission device, including: a receiving circuit, configured to receive an acknowledgement packet; a sending circuit, configured to send an acknowledgement packet; a memory, storing a data volume threshold; and a processor, connected to the receiving circuit, the sending circuit, and the memory, and configured to update a total data volume that is reflected by all sent acknowledgement packets within a current sending period as having been acknowledged by a data receiving end, compare the updated total data volume with the data volume threshold, and control, according to a result of the comparison, whether the sending circuit continues to send an acknowledgement packet within the current sending period.

According to a third aspect, an embodiment of the present application provides a data transmission device, including: a sending unit, configured to send an acknowledgement packet; an updating unit, configure to update a total data volume that is reflected by all sent acknowledgement packets within a current sending period as having been acknowledged by a data receiving end; and a control unit, configured to compare the updated total data volume with a data volume threshold, and control, according to a result of the comparison, whether to continue to send an acknowledgement packet within the current sending period.

According to a fourth aspect, an embodiment of the present application provides a communications system, including a data sending end, a data receiving end, and the data transmission device according to the second aspect or the third aspect, where the data sending end communicates with the data receiving end through the data transmission device.

According to a fifth aspect, an embodiment of the present application provides a computer program product, including a computer-readable medium, where the computer-readable medium includes a set of program code, which is used to perform the method according to the first aspect.

As can be seen, in the foregoing aspects, a sending period and a data volume threshold are set on a data transmission device, and the data volume threshold is used to control acknowledgement packets sent by the data transmission device to a data sending end within each sending period, so that a total data volume that is reflected by all the sent acknowledgement packets as having been acknowledged by a data receiving end is within the data volume threshold. In this way, the quantity of acknowledgement packets received by the data sending end within each sending period fulfills a requirement that the total data volume that is reflected by all the received acknowledgement packets as having been acknowledged by the data receiving end is within the data volume threshold, thereby solving a problem of sending a large quantity of packets by the data sending end.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION OF ILLUSTRATIVE EMBODIMENTS

Figure 1:
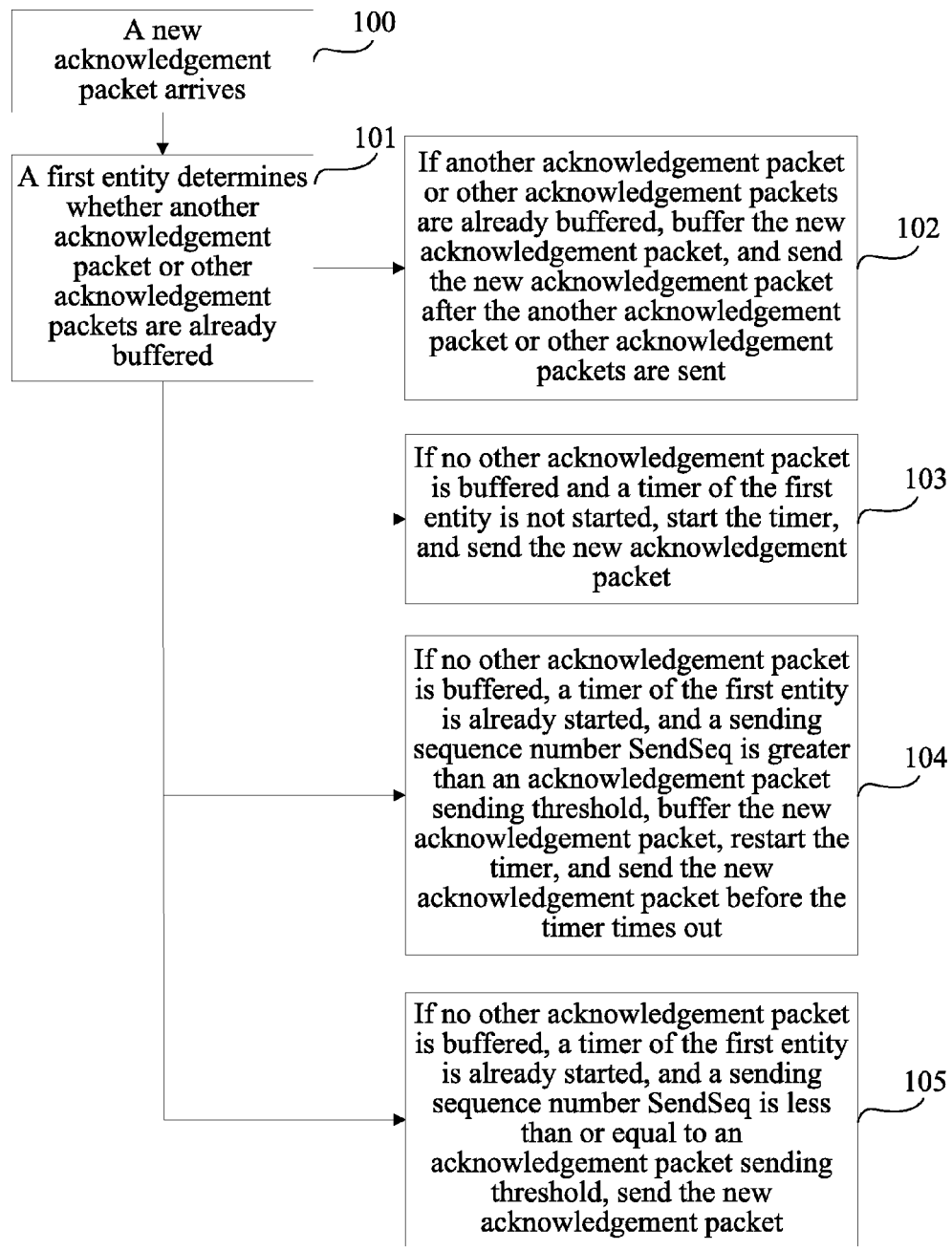
FIG. 1 is a flowchart of a method for processing an acknowledgement packet according to an embodiment of the present application.

The following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

To make the advantages of the technical solutions of the present application clearer, the following describes the present application in detail with reference to the accompanying drawings and embodiments.

TCP/IP was developed and designed for wired transmission, and after TCP/IP is introduced to a wireless communications system, limitations of the wireless communications system result in a fluctuation of air-interface signals. For downlink data transmission, a server may not receive, within several milliseconds or hundreds of milliseconds, any acknowledgement packet returned by a terminal; after the fluctuation of air-interface signals disappears, the server receives a large quantity of acknowledgement packets within a short period of time, leading to a problem that the server delivers a large quantity of packets to the terminal according to the large quantity of received acknowledgement packets. Similarly, for uplink data transmission, the same problem may also exist when the terminal sends a packet to the server.

In consideration of this problem, in the embodiments of the present application, a sending period and a data volume threshold are set on a data transmission device, and the data volume threshold is used to control acknowledgement packets sent by the data transmission device to a data sending end within each sending period, so that a total data volume that is reflected by all the sent acknowledgement packets as having been acknowledged by a data receiving end is within the data volume threshold. In this way, the quantity of acknowledgement packets received by the data sending end within each sending period fulfills that the total data volume that is reflected by all the received acknowledgement packets as having been acknowledged by the data receiving end is within the data volume threshold, thereby solving a problem of sending a large quantity of packets by the data sending end.

The data transmission device described in the embodiments of the present application may be a conventional data transmission node device in a wireless network, such as an access network device, or a core network device, or may be a data transmission device disposed on an access network side and independent from a conventional access network device, or a data transmission device disposed on a core network side and independent from a conventional core network device. For example, the data transmission device may be a base station in various communications systems, such as a base transceiver station (BTS), a NodeB, or an evolved NodeB (eNB or eNodeB); or may be a base station controller (BSC) in a Global System for Mobile Communications (GSM) or a radio network controller (RNC) in a Universal Mobile Telecommunications System (UMTS), which is not limited in the present application.

The data sending end in the embodiments of the present application may be a server, or may be a terminal; and the corresponding data receiving end may be a terminal, or may be a server. For example, in uplink data transmission, the data sending end is a terminal, and the data receiving end is a server; and in downlink data transmission, the data sending end is a server, and the data receiving end is a terminal, which is not limited in the present application.

Correspondingly, the acknowledgement packet in the embodiments of the present application may be an uplink acknowledgement packet, or may be a downlink acknowledgement packet.

Figure 8:
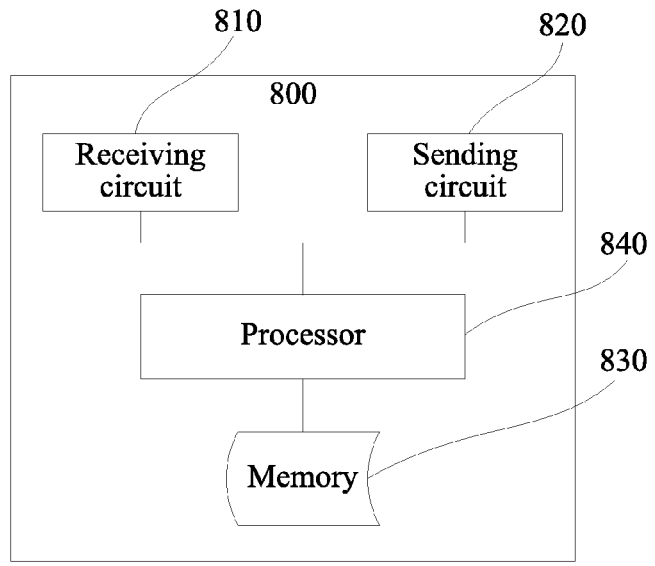
FIG. 8 is a schematic structural diagram of a data transmission device according to Embodiment 1 of the present application.

Refer to FIG. 8, which is a schematic structural diagram of a data transmission device according to Embodiment 1 of the present application. As shown in the figure, the data transmission device 800 includes a receiving circuit 810, a sending circuit 820, a memory 830, and a processor 840 connected to the receiving circuit 810, the sending circuit 820, and the memory 830. The receiving circuit 810 is configured to receive an acknowledgement packet; the sending circuit 820 is configured to send an acknowledgement packet; the memory 830 stores a data volume threshold; and the processor 840 is configured to update a total data volume that is reflected by all sent acknowledgement packets within a current sending period as having been acknowledged by a data receiving end, and control, according to the updated total data volume and the data volume threshold that is stored by the memory 840, whether the sending circuit 820 continues to send an acknowledgement packet within the current sending period.

The foregoing data transmission device updates, within a sending period, a total data volume that is reflected by all sent acknowledgement packets as having been acknowledged by a data receiving end, compares the updated total data volume with a locally stored data volume threshold, and controls, according to a result of the comparison, whether to continue to send an acknowledgement packet within the current sending period, so that not too many acknowledgement packets arrive at a data sending end within a sending period, thereby solving a problem of sending a large quantity of packets by the data sending end. Sending a large quantity of packets by the data sending end may lead to a problem that packets may not be transmitted in time and a problem of packet loss. For example, a server generally has a strong transmit capability, and when receiving many acknowledgement packets within a period of time, the server delivers a large quantity of packets according to the received acknowledgement packets, which leads to a data burst. However, a transmit capability of an intermediate transmission network element is often not strong enough, thereby causing a problem of packets not being transmitted in time and a problem of packet loss. In the foregoing embodiment, the intermediate transmission network element restricts the use of the transmit capability of the server, so as to solve the problem of packets not being transmitted in time and the problem of packet loss due to a burst of data at the data sending end.

It should be noted that a person skilled in the art may set a value or a range of the data volume threshold according to an actual need or as required by an operator, which is not limited in the present application. For example, in downlink data transmission, a server has a strong processing capability, and a bearer capability of a wireless network in which the data transmission device is located cannot suffice to withstand an impact resulting from a burst of server data, and consequently, a problem of packet loss occurs and transmission is not performed in time. In this case, the data volume threshold may be set based on a bearer capability of a bearer network. The bearer capability of the bearer network may be a bearer capability of a transmission network element between an access network and a core network, such as a bearer capability of a switch, or a router. For another example, the data volume threshold may also be limited by a limited rate of a bearer link, and the bearer link may be a link between an access network and a core network. For another example, the data volume threshold may also be limited by a transmission bandwidth of the wireless network in which the data transmission device is located. For another example, when the data sending end or the data receiving end has a limited processing capability, the data volume threshold may also be determined according to the processing capability of the data sending end or the data receiving end, for example, determined according to a Transmission Control Protocol (TCP) send window of the data sending end or a TCP receive window of the data receiving end.

Moreover, with respect to the updating a total data volume that is reflected by all sent acknowledgement packets within a current sending period as having been acknowledged by a data receiving end, the total data volume may be updated each time one acknowledgement packet is sent, or the total data volume may be updated each time two or more acknowledgement packets are sent, or the sending period may be divided into time segments, where within a early time segment, the total data volume is updated each time multiple acknowledgement packets are sent, and within a later time segment, the total data volume is updated each time one acknowledgement packet is sent. In addition, the quantity of acknowledgement packets sent after a previous updating and before a next updating may be determined according to a result of the previous updating. For ease of implementation, the total data volume may be updated each time one acknowledgement packet is sent, which is not limited in the present application.

Figure 9:
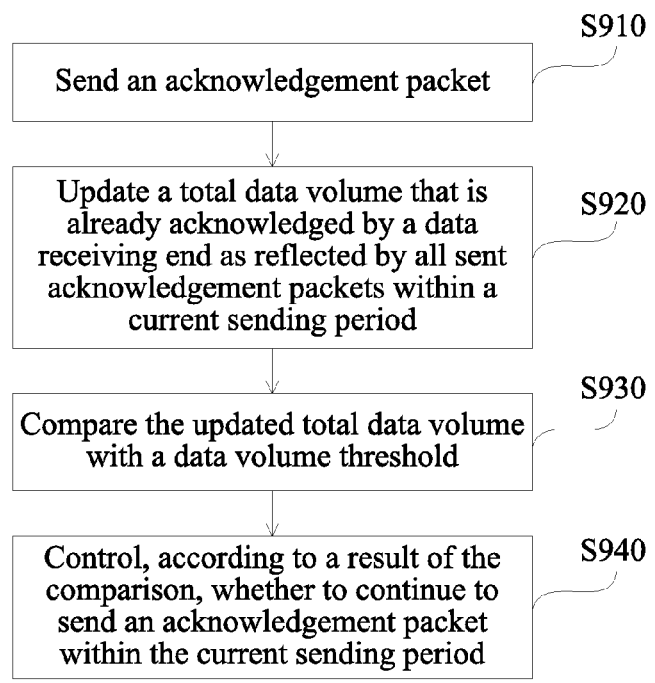
FIG. 9 is a schematic flowchart of a method for processing an acknowledgement packet according to Embodiment 2 of the present application.

Corresponding to Embodiment 1, Embodiment 2 of the present application further provides a method for processing an acknowledgement packet. Refer to FIG. 9, which is a schematic flowchart of a method for processing an acknowledgement packet according to Embodiment 2 of the present application. As shown in FIG. 9, the method includes the following steps.

S910: Send an acknowledgement packet.

S920: Update a total data volume that is reflected by all sent acknowledgement packets within a current sending period as having been acknowledged by a data receiving end.

S930: Compare the updated total data volume with a data volume threshold.

S940: Control, according to a result of the comparison, whether to continue to send an acknowledgement packet within the current sending period.

In the foregoing method for processing an acknowledgement packet, a total data volume that is reflected by all sent acknowledgement packets as having been acknowledged by a data receiving end is updated within a sending period, the updated total data volume is compared with a locally stored data volume threshold, and it is controlled, according to a result of the comparison, whether to continue to send an acknowledgement packet within the current sending period, so that not too many acknowledgement packets arrive at a data sending end within one sending period, thereby solving a problem of sending a large quantity of packets by the data sending end. Sending a large quantity of packets by the data sending end may lead to a problem that packets may not be transmitted in time and a problem of packet loss. For example, a server generally has a strong transmit capability, and when receiving many acknowledgement packets within a period of time, the server delivers a large quantity of packets according to the received acknowledgement packets, which leads to a data burst. However, a transmit capability of an intermediate transmission network element is often not strong enough, thereby causing a problem of packets not being transmitted in time and a problem of packet loss. In the foregoing embodiment, the intermediate transmission network element restricts the use of the transmit capability of the server, so as to solve the problem of packets not being transmitted in time and the problem of packet loss due to a burst of data at the data sending end.

Descriptions of the data volume threshold and updating the total data volume are the same as those in Embodiment 1, and details are not described herein again.

The following describes in detail a process of updating a total data volume by the processor 840 or a process of updating the total data volume in the foregoing step S920.

The foregoing total data volume may be updated according to an acknowledgement packet sequence number of an acknowledgement packet. The acknowledgement packet sequence number of the acknowledgement packet is a sequence number of a TCP ACK, where the sequence number of the TCP ACK indicates that data prior to the sequence number has all been acknowledged by the data receiving end. Therefore, each time one acknowledgement packet is sent, a data volume that is reflected by the currently sent acknowledgement packet as being acknowledged by the data receiving end may be determined according to a difference between a sequence number of the currently sent acknowledgement packet and a sequence number of a previously sent acknowledgement packet. In this way, the total data volume that is reflected by all sent acknowledgement packets within a sending period as being acknowledged by the data receiving end may be updated by using the data volume that is reflected by each acknowledgement packet as being acknowledged by the data receiving end. For example, assuming that a sequence number of a sent acknowledgement packet is 747337662, it indicates that data prior to the 747337662 byte has all been acknowledged by the data receiving end; and a sequence number of an acknowledgement packet sent after the acknowledgement packet is 747340582, and it indicates that data prior to the 747340582$^{th}$ byte has all been received. In this case, the updated total data volume=total data volume before updating+(747340582−747337662).

Figure 10:
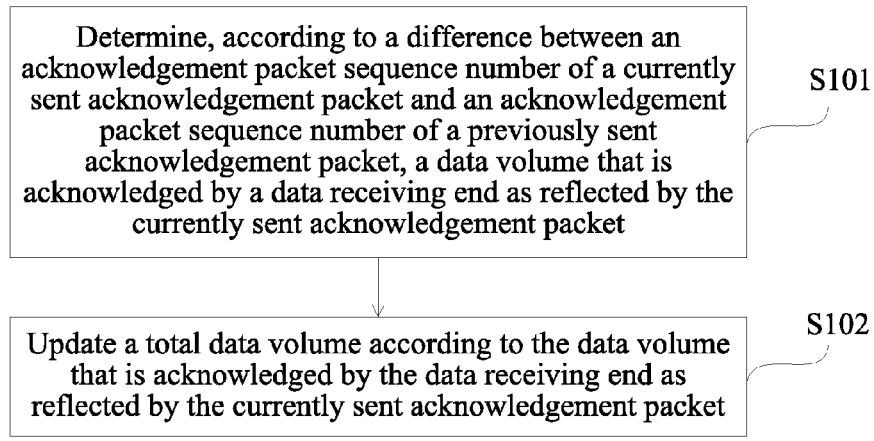
FIG. 10 is a schematic flowchart of a method for updating a total data volume according to Embodiment 2 of the present application.

That means, as shown in FIG. 10, the step S920 of updating a total data volume that is reflected by all sent acknowledgement packets within a current sending period as having been acknowledged by a data receiving end may further include:

S101: Determine, according to a difference between the acknowledgement packet sequence number of the currently sent acknowledgement packet and an acknowledgement packet sequence number of a previously sent acknowledgement packet, a data volume that is reflected by the currently sent acknowledgement packet as being acknowledged by the data receiving end.

S102: Update the total data volume according to the data volume that is reflected by the currently sent acknowledgement packet as being acknowledged by the data receiving end.

It should be noted that an acknowledgement packet sequence number of an acknowledgement packet is generally expressed in an n-bit binary form. When the acknowledgement packet sequence number is assigned a maximum numerical value that can be expressed by the n-bit binary number, numbering starts from a minimum numerical value again, which is a phenomenon called sequence number wrap. When the acknowledgement packet sequence number of the currently sent acknowledgement packet is wrapped, a difference between the acknowledgement packet sequence number of the currently sent acknowledgement packet and the acknowledgement packet sequence number of the previous acknowledgement packet is a negative value, and a problem occurs when updating is performed according to the foregoing method. Therefore, when the acknowledgement packet sequence number of the currently sent acknowledgement packet is wrapped, updating may not be performed, that means, the total data volume remains unchanged. In this case, even though a data volume reflected by one acknowledgement packet is ignored, an implementation effect is not affected. This is because in this embodiment of the present application, a total data volume reflected by acknowledgement packets that are sent to the data sending end within a sending period is not intended to be strictly controlled below the data volume threshold, but is intended to be controlled around the data volume threshold. Even though the total data volume exceeds a data volume threshold for a data volume reflected by one acknowledgement packet, the essence of the present application is not affected, and there is no essential impact on achieving the effect of the solution.

The following describes in detail a process of controlling, by the processor 840 according to a result of the comparison, whether the sending circuit 820 continues to send an acknowledgement packet within the current sending period or a process of controlling, according to a result of the comparison, whether to continue to send an acknowledgement packet within the current sending period in step S940.

When the updated total data volume is greater than the data volume threshold, sending an acknowledgement packet within the current sending period is stopped, which may be implemented by controlling, by the processor 840, the sending circuit 820 to stop sending an acknowledgement packet within the current sending period. When the updated total data volume is less than the data volume threshold, sending an acknowledgement packet within the current sending period may be continued, which may be implemented by controlling, by the processor 840, the sending circuit 820 to continue to send an acknowledgement packet within the current sending period.

The following describes a processing manner for a case in which the updated total data volume is equal to the data volume threshold. In this case, sending an acknowledgement packet within the current sending period may be stopped, or sending an acknowledgement packet may be continued. For example, the processor 840 may control the sending circuit 820 to stop sending an acknowledgement packet within the current sending period, or may control the sending circuit 820 to continue to send an acknowledgement packet within the current sending period. This is because in this embodiment of the present application, a total data volume that is reflected by acknowledgement packets which are sent by the data transmission device 800 to the data sending end within a sending period as having been acknowledged by the data receiving end is not intended to be strictly controlled below the data volume threshold, but is intended to be controlled around the data volume threshold. Even though the total data volume exceeds a data volume threshold for a data volume reflected by one acknowledgement packet, there is no essential impact on achieving the effect of the solution.

Moreover, a value within a certain range of the data volume threshold may be used as a basis for stopping sending and continuing to send an acknowledgement packet. For example, when it is found, after the updated total data volume is compared with the data volume threshold, that the updated total data volume is close to but does not reach the data volume threshold, sending an acknowledgement packet may also be stopped. In a word, the present application is not intended to strictly limit the process of comparing the updated total data volume with the data volume threshold and controlling, according to a result of the comparison, whether the sending circuit continues to send an acknowledgement packet within the current sending period, on condition that the total data volume that is reflected by the acknowledgement packets, which are sent to the data sending end within a sending period, as having been acknowledged by the data receiving end is controlled around the data volume threshold, and a person skilled in the art may work flexibly based on this, to obtain different embodiments, which all fall within the protection scope of the present application.

Therefore, for detail, this embodiment may include various implementations, which are described below by using examples. However, the examples are not intended to limit the present application.

Figure 11:
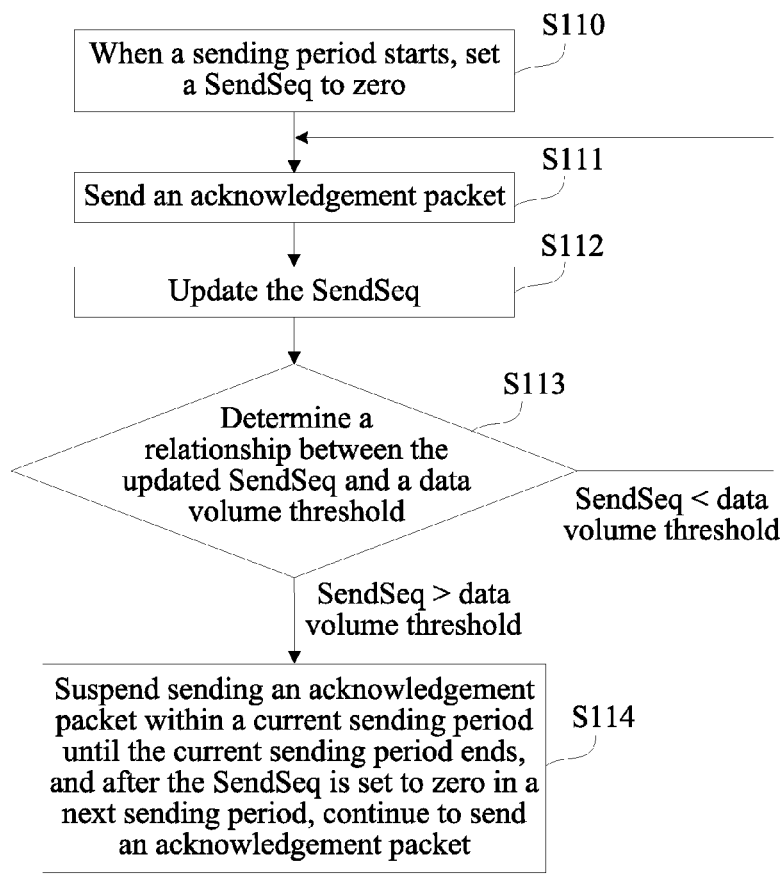
FIG. 11 is a schematic flowchart of a method for processing an acknowledgement packet according to Embodiment 3 of the present application.

Refer to FIG. 11, which is a schematic flowchart of a method for processing an acknowledgement packet according to Embodiment 3 of the present application. The method is executed by a data transmission device, where the data transmission device pre-stores a data volume threshold, and uses a sending sequence number (SendSeq) to represent a total data volume that is reflected by all sent acknowledgement packets within a sending period as having been acknowledged by a data receiving end. As shown in FIG. 11, the method includes the following steps:

S110: When a sending period starts, set the SendSeq to zero.

Subsequently, within the current sending period, the SendSeq is updated each time one acknowledgement packet is sent, and each time the SendSeq is updated, a relationship between the updated SendSeq and the data volume threshold is determined. That means, within the current sending period, the following step S111 to step S113 are performed repeatedly until the current sending period ends or the updated SendSeq is greater than the data volume threshold.

S111: Send an acknowledgement packet.

S112: Update the SendSeq.

S113: Determine a relationship between the updated SendSeq and the data volume threshold. If the updated SendSeq is less than the data volume threshold, step S111 to step S113 are continued to be performed; if the updated SendSeq is greater than the data volume threshold, step S114 is performed.

S114: Suspend sending an acknowledgement packet within the current sending period until the current sending period ends, and after the SendSeq is set to zero in a next sending period, continue to send an acknowledgement packet.

A description of the data volume threshold is the same as that in Embodiment 1, and details are not described herein again.

In this embodiment, the SendSeq may be determined by using a difference between acknowledgement packet sequence numbers, where an acknowledgement packet sequence number is used to indicate that data prior to the acknowledgement packet sequence number has all been acknowledged by the data receiving end, and in this case, a difference between two acknowledgement packet sequence numbers may reflect an already acknowledged data volume which corresponds to a currently sent acknowledgement packet. In addition, each time one acknowledgement packet is sent, the SendSeq is updated by accumulating the already acknowledged data volume which corresponds to the sent acknowledgement packet, and the updated SendSeq may reflect the total data volume that is reflected by acknowledgement packets as having been acknowledged, where the acknowledgement packets are sent by a data transmission device within a period. In this way, the quantity of acknowledgement packets sent within a sending period is controlled by monitoring the SendSeq, so as to solve a problem of sending a large quantity of packets by a data sending end, thereby further solving a problem of packets not being transmitted in time and a problem of packet loss.

It should be noted that if the updated SendSeq is equal to the data volume threshold, sending an acknowledgement packet may be suspended until the current sending period ends and be resumed after the sending sequence number is set to zero in a next sending period; or sending an acknowledgement packet may be continued, a reason of which is the same as described in the foregoing embodiment and is not described herein again.

In a process of updating the SendSeq in the foregoing step S112, a relationship between the updated SendSeq and a SendSeq before updating is as follows: updated SendSeq=SendSeq before updating+Max (0, acknowledgement packet sequence number of a first acknowledgement packet−acknowledgement packet sequence number of a second acknowledgement packet), where Max( ) indicates that a maximum value is selected, and the first acknowledgement packet and the second acknowledgement packet are two acknowledgement packets that are consecutively sent by the data transmission device to a data sending end, where the first acknowledgement packet is an acknowledgement packet that is most recently sent before the SendSeq is updated, and the second acknowledgement packet is an acknowledgement packet sent before the first acknowledgement packet. In order that an acknowledgement packet sequence number of the second acknowledgement packet can be used when the SendSeq is updated, this acknowledgement packet sequence number needs to be stored before the second acknowledgement packet is sent. Therefore, the acknowledgement packet sequence number of the second acknowledgement packet is also an acknowledgement packet sequence number that is already stored by the data transmission device. That is, updated SendSeq=SendSeq before updating+Max (0, acknowledgement packet sequence number of the acknowledgement packet that is most recently sent before the SendSeq is updated−already stored acknowledgement packet sequence number).

As can be seen, in a process of updating the SendSeq, each time one acknowledgement packet is sent, an acknowledgement packet sequence number of the acknowledgement packet is used to update the already stored acknowledgement packet sequence number. That is, after the SendSeq is updated, the method further includes: updating the already stored acknowledgement packet sequence number of the acknowledgement packet, where when the already stored acknowledgement packet sequence number of the acknowledgement packet is updated, if the acknowledgement packet sequence number of the acknowledgement packet that is most recently sent before the SendSeq is updated is greater than the already stored acknowledgement packet sequence number, or a difference between the acknowledgement packet sequence number of the acknowledgement packet that is most recently sent before the SendSeq is updated and the already stored acknowledgement packet sequence number is less than a preset value, the currently stored acknowledgement packet sequence number is updated to be the acknowledgement packet sequence number of the acknowledgement packet that is most recently sent before the SendSeq is updated; otherwise, it indicates that the two consecutively sent acknowledgement packet sequence numbers are the same, and the already stored acknowledgement packet sequence number may remain unchanged, where the preset value is determined according to the quantity of bits of an acknowledgement packet sequence number.

When an acknowledgement packet sequence number is indicated by using a character of n bits, the preset value is $-2^{n-1}$. When a difference between the acknowledgement packet sequence number of the acknowledgement packet that is most recently sent before the sending sequence number is updated and the already stored acknowledgement packet sequence number is less than the preset value, it indicates that sequence number wrap occurs, that means, an acknowledgement packet is renumbered starting from "0", and the currently stored acknowledgement packet sequence number is updated to be the acknowledgement packet sequence number of the acknowledgement packet that is most recently sent before the sending sequence number is updated, so as to facilitate subsequent updating of the SendSeq. In addition, when sequence number wrap occurs, the SendSeq may not be updated, that is, updated SendSeq=SendSeq before updating+Max $(0, -2^{n-1})$=SendSeq before updating. In this case, even though this may result in one more acknowledgement packet being sent, there is no essential impact on achieving the effect of the solution.

For example, a character of 32 bits is used for indicating an acknowledgement packet sequence number, and the preset value is −2147483648. When the difference between the acknowledgement packet sequence number of the acknowledgement packet that is most recently sent before the sending sequence number is updated and the already stored acknowledgement packet sequence number is less than −2147483648, it indicates that sequence number wrap occurs, and the SendSeq may not be updated, but the already stored acknowledgement packet sequence number is updated.

In an embodiment of the present application, a timer may be disposed in the data transmission device so as to implement control of the foregoing sending period, where a duration of the timer is equal to the sending period. In this case, the foregoing step S110 of setting the sending sequence number to zero when the sending period starts may be implemented in the following manner: starting the timer, and setting the sending sequence number to zero. The foregoing step S114 of suspending sending an acknowledgement packet within the current sending period until the current sending period ends, and after the SendSeq is set to zero in a next sending period, continuing to send an acknowledgement packet may be implemented in the following manner: when the timer times out, restarting the timer, and after setting the sending sequence number to zero, continuing to send an acknowledgement packet.

Figure 12:
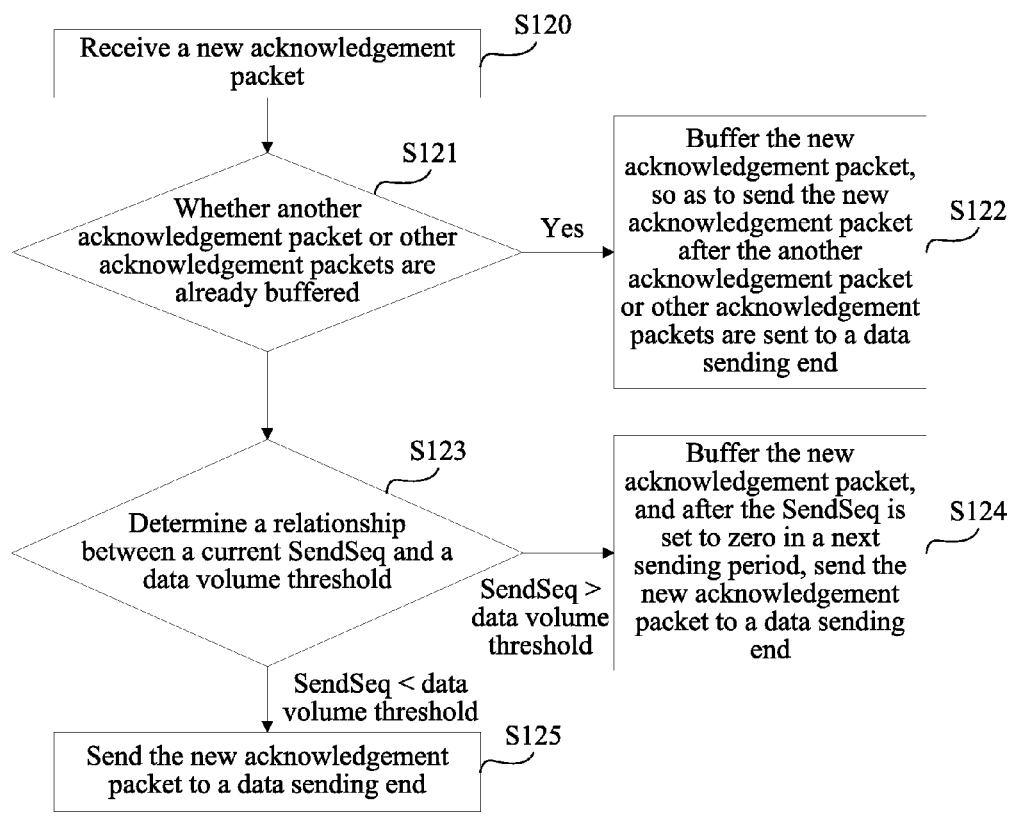
FIG. 12 is a schematic flowchart of a method for processing an acknowledgement packet according to Embodiment 4 of the present application.

Further refer to FIG. 12, which is a schematic flowchart of a method for processing an acknowledgement packet according to Embodiment 4 of the present application. The method is executed by a data transmission device, a SendSeq is used to indicate a total data volume that is reflected by all sent acknowledgement packets within a sending period as having been acknowledged by a data receiving end. As shown in FIG. 12, the method includes the following steps:

S120: Receive a new acknowledgement packet.

S121: Determine whether another acknowledgement packet or other acknowledgement packets are already buffered; and if another acknowledgement packet or other acknowledgement packets are already buffered, perform step S122; otherwise, perform step S123.

S122: Buffer the new acknowledgement packet, so as to send the new acknowledgement packet after the another acknowledgement packet or other acknowledgement packets are sent to a data sending end.

S123: Determine a relationship between a current SendSeq and a data volume threshold, and if the current SendSeq is greater than the data volume threshold, perform step S124; if the current SendSeq is less than the data volume threshold, perform step S125.

S124: Buffer the new acknowledgement packet, and after the SendSeq is set to zero in a next sending period, send the new acknowledgement packet to the data sending end.

S125: Send the new acknowledgement packet to the data sending end.

It should be noted that when an updated sending sequence number is equal to the data volume threshold, sending an acknowledgement packet may be suspended until the current sending period ends and is resumed after the sending sequence number is set to zero in a next sending period; or sending an acknowledgement packet may be continued.

Figure 13:
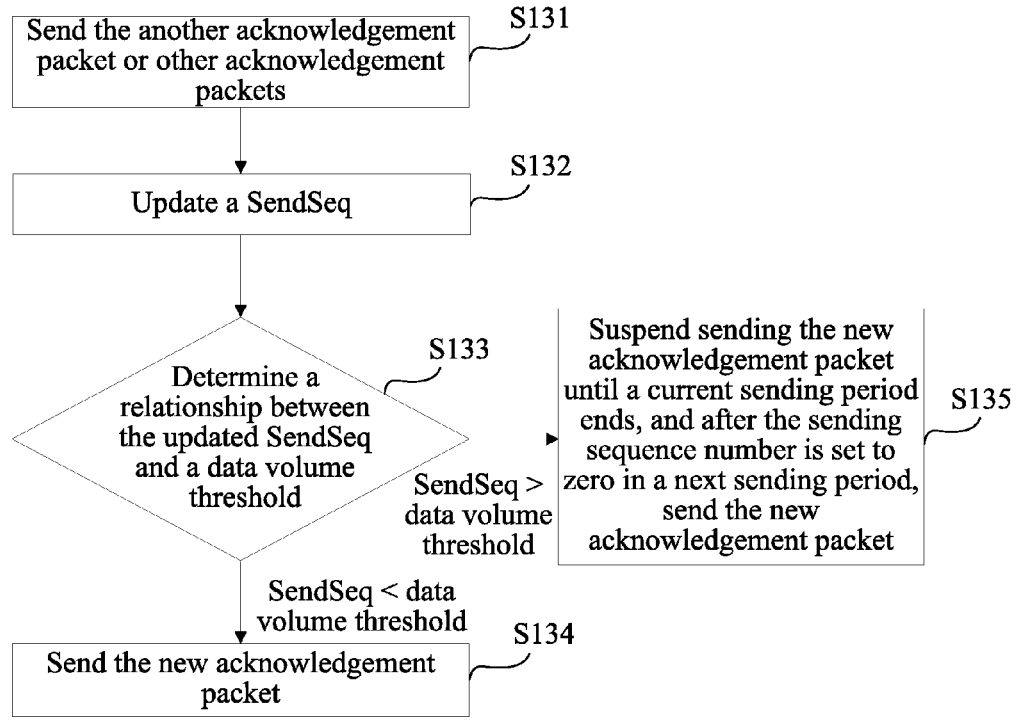
FIG. 13 is a detailed schematic flowchart of step S122 of the method for processing an acknowledgement packet shown in FIG. 12.

Further referring to FIG. 13, the foregoing step S122 of sending the new acknowledgement packet after the another acknowledgement packet or other acknowledgement packets are sent to a data sending end, may include the following steps:

S131: Send the another acknowledgement packet or other acknowledgement packets.

S132: Update the SendSeq.

S133: Determine a relationship between the updated SendSeq and the data volume threshold, and if the updated SendSeq is less than the data volume threshold, perform step S134; if the updated SendSeq is greater than the data volume threshold, perform step S135. When the updated SendSeq is equal to the data volume threshold, step S134 may be performed, or step S135 may be performed, and reasons for which are the same as described in the foregoing descriptions, and are not described herein again.

S134: Send the new acknowledgement packet.

S135: Suspend sending the new acknowledgement packet until the current sending period ends, and after the sending sequence number is set to zero in a next sending period, send the new acknowledgement packet.

Figure 14:
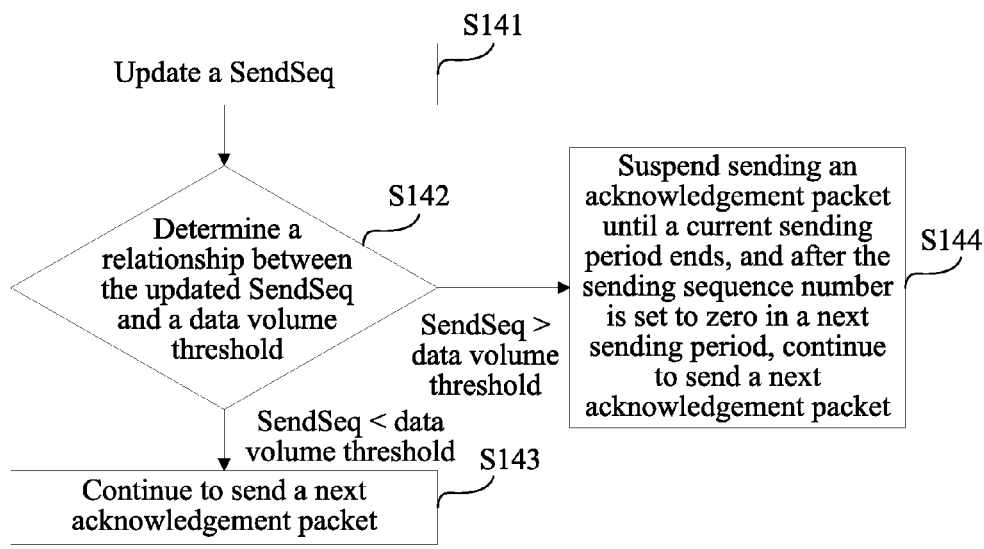
FIG. 14 is a detailed schematic flowchart of step S131 of the method for processing an acknowledgement packet shown in FIG. 13.

It should be noted that when the data transmission device receives the new acknowledgement packet, one another acknowledgement packet may be buffered or multiple other acknowledgement packets may be buffered in the data transmission device. That means, there may be one or more other acknowledgement packets. In addition, referring to FIG. 14, when there are multiple other acknowledgement packets, the foregoing step S131 of sending the other acknowledgement packets may include: sending the other acknowledgement packets one by one according to a queue sequence, and each time one acknowledgement packet is sent, repeating the following steps, until all the other acknowledgement packets are sent.

S141: Update the SendSeq.

S142: Determine a relationship between the updated SendSeq and the data volume threshold; and if the updated SendSeq is less than the data volume threshold, perform step S143; if the updated SendSeq is greater than the data volume threshold, perform step S144. When the updated SendSeq is equal to the data volume threshold, step S143 may be performed, or step S144 may be performed, and reasons for which are the same as described in the foregoing descriptions, and are not described herein again.

S143: Continue to send a next acknowledgement packet.

S144: Suspend sending an acknowledgement packet until the current sending period ends, and after the sending sequence number is set to zero in a next sending period, continue to send a next acknowledgement packet.

A process of updating the SendSeq is the same as described in Embodiment 3, and is not described herein again.

In addition, in this embodiment, a timer may also be disposed in the data transmission device so as to implement control of the foregoing sending period, where a duration of the timer is equal to the sending period.

It should be noted that in the foregoing Embodiment 3 and Embodiment 4, the SendSeq is set to zero when the sending period starts, and then the SendSeq is updated according to an already acknowledged data volume that is reflected by sent acknowledgement packets. This is only an example. In another embodiment, the SendSeq may be set to "1" or another numerical value, and the data volume threshold is adjusted accordingly, or when the SendSeq is set to "1" or another small numerical value and achievement of the effect of the present application is not affected, the data volume threshold may not be adjusted, which is not limited in the embodiment of the present application.

Figure 15:
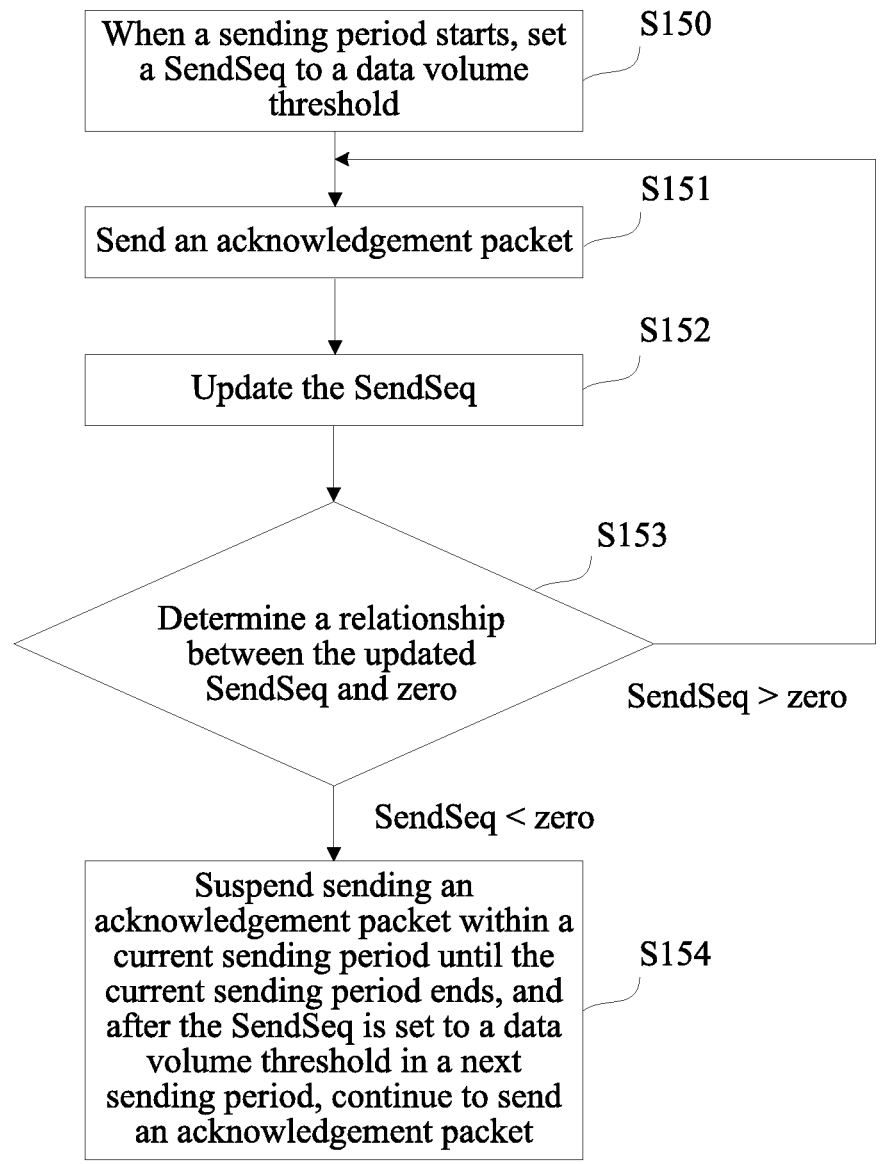
FIG. 15 is a schematic flowchart of a method for processing an acknowledgement packet according to Embodiment 5 of the present application.

For example, in Embodiment 5 of the present application, when a sending period starts, the SendSeq is set to a data volume threshold, and each time one acknowledgement packet is sent, the SendSeq is updated in a decremental manner, and when the SendSeq is decremented to zero or less than zero, sending an acknowledgement packet within this period is stopped. Referring to FIG. 15, in this case, a method for processing an acknowledgement packet includes the following steps.

S150: When a sending period starts, set the SendSeq to a data volume threshold.

Subsequently, within the current sending period, the SendSeq is updated each time one acknowledgement packet is sent, and each time the SendSeq is updated, a relationship between the updated SendSeq and zero is determined. That is, within the current sending period, the following step S151 to step S153 are performed repeatedly until the current sending period ends or the updated SendSeq is less than zero.

S151: Send an acknowledgement packet.

S152: Update the SendSeq.

S153: Determine a relationship between the updated SendSeq and zero. If the updated SendSeq is greater than zero, step S151 to step S153 are continued to be performed; if the updated SendSeq is less than zero, step S154 is performed.

S154: Suspend sending an acknowledgement packet within the current sending period until the current sending period ends, and after the SendSeq is set to the data volume threshold in a next sending period, continue to send an acknowledgement packet.

In this case, updating of the SendSeq is as follows: updated SendSeq=SendSeq before updating−Max (0, acknowledgement packet sequence number of a first acknowledgement packet−acknowledgement packet sequence number of a second acknowledgement packet), where Max( ) indicates that a maximum value is selected, and the first acknowledgement packet and the second acknowledgement packet are two acknowledgement packets that are consecutively sent by a data transmission device to a data sending end, where the first acknowledgement packet is an acknowledgement packet that is most recently sent before the SendSeq is updated, and the second acknowledgement packet is an acknowledgement packet sent before the first acknowledgement packet. In order that an acknowledgement packet sequence number of the second acknowledgement packet can be used when the SendSeq is updated, this acknowledgement packet sequence number needs to be stored before the second acknowledgement packet is sent. Therefore, the acknowledgement packet sequence number of the second acknowledgement packet is also an acknowledgement packet sequence number that is already stored by an access network device. That is, updated SendSeq=SendSeq before updating−Max (0, acknowledgement packet sequence number of the acknowledgement packet that is most recently sent before the sending sequence number is updated−already stored acknowledgement packet sequence number).

As can be seen, in a process of updating the SendSeq, each time one acknowledgement packet is sent, an acknowledgement packet sequence number of the acknowledgement packet is used to update the already stored acknowledgement packet sequence number. That is, after the SendSeq is updated, the method further includes: updating the already stored acknowledgement packet sequence number of the acknowledgement packet, where updating the already stored acknowledgement packet sequence number is the same as described in Embodiment 3, and is not described herein again.

In addition, in a case in which the updated SendSeq is equal to zero, sending an acknowledgement packet may be suspended until the current sending period ends and is resumed after the sending sequence number is set to the data volume threshold in a next sending period; or sending an acknowledgement packet may also be continued.

Figure 16:
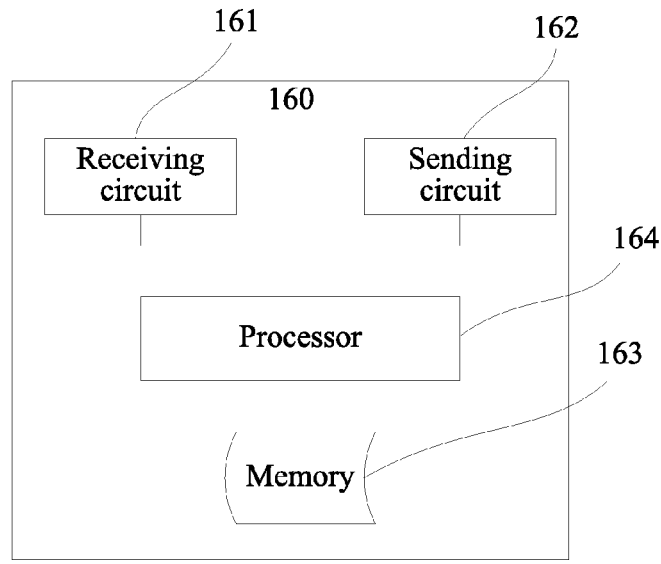
FIG. 16 is a schematic structural diagram of a data transmission device according to Embodiment 6 of the present application.

Further refer to FIG. 16, which is a schematic structural diagram of a data transmission device according to Embodiment 6 of the present application. As shown in FIG. 16, the data transmission device 160 includes a receiving circuit 161, a sending circuit 162, a memory 163, and a processor 164. The receiving circuit 161 is configured to receive an acknowledgement packet; the sending circuit 162 is configured to send an acknowledgement packet; the memory 163 stores a data volume threshold; and the processor 164 is connected to the receiving circuit 161, the sending circuit 162, and the memory 163. The processor 164 is configured to update a difference between the data volume threshold and a total data volume, where the total data volume is a total data volume that is reflected by all sent acknowledgement packets within a current sending period as having been acknowledged by a data receiving end, and the processor 164 is further configured to control, according to the difference between the updated data volume threshold and the total data volume, whether the sending circuit 162 continues to send an acknowledgement packet within the current sending period.

As can be seen, a difference between this embodiment and Embodiment 1 lies in that the processor 164 updates the difference between the data volume threshold and the total data volume based on the data volume threshold, and controls, according to the difference, whether the sending circuit 162 continues to send an acknowledgement packet within the current sending period. Because the data volume threshold is preset, a change in the difference between the data volume threshold and the total data volume in fact reflects a change in the total data volume. Therefore, using the difference to control whether to continue to send an acknowledgement packet within a sending period can achieve a same effect as when Embodiment 1 is in use.

Figure 17:
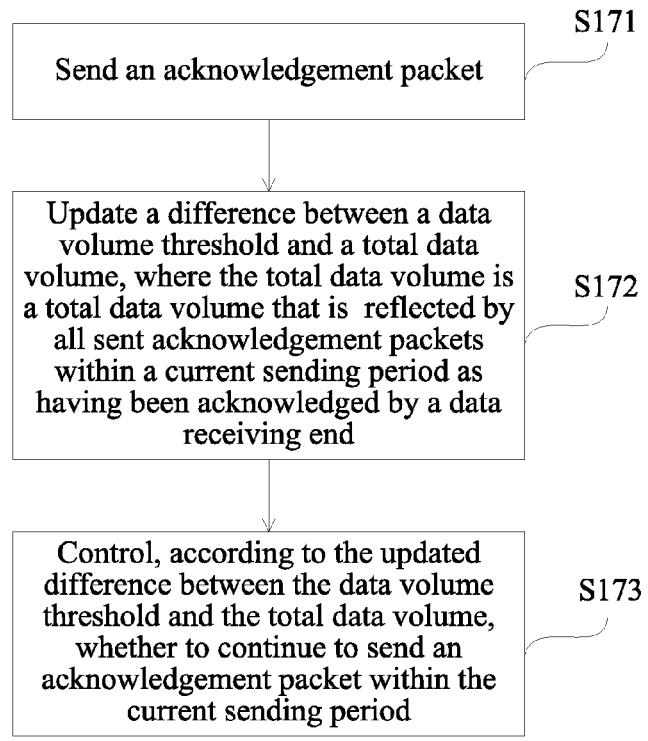
FIG. 17 is a schematic flowchart of a method for processing an acknowledgement packet according to Embodiment 7 of the present application.

Corresponding to Embodiment 6, Embodiment 7 of the present application further provides a method for processing an acknowledgement packet. Refer to FIG. 17, which is a schematic flowchart of a method for processing an acknowledgement packet according to Embodiment 7 of the present application. As shown in FIG. 17, the method includes the following steps:

S171: Send an acknowledgement packet.

S172: Update a difference between a data volume threshold and a total data volume, where the total data volume is a total data volume that reflected by all sent acknowledgement packets within a current sending period as having been acknowledged by a data receiving end.

S173: Control, according to the updated difference between the data volume threshold and the total data volume, whether to continue to send an acknowledgement packet within the current sending period.

A description of the data volume threshold in Embodiment 6 and Embodiment 7 is the same as described in Embodiment 1, and is not described herein again.

A manner and frequency of updating the difference between the data volume threshold and the total data volume, for example, are the same as the description in Embodiment 1, and are not described herein again.

The following describes a process of updating, by the processor 164, the difference between the data volume threshold and the total data volume or a process of updating the total data volume in the foregoing step S172.

Updating the difference between the data volume threshold and the total data volume is a process of updating the total data volume based on the data volume threshold. Updating of the total data volume is the same as described in the foregoing Embodiment 1, and each time the total volume is updated, subtraction is performed on the data volume threshold and the total data volume, so that the difference between the data volume threshold and the total data volume after updating can be obtained. In addition, when a current acknowledgement packet sequence number is wrapped, updating may also not be performed.

Figure 18:
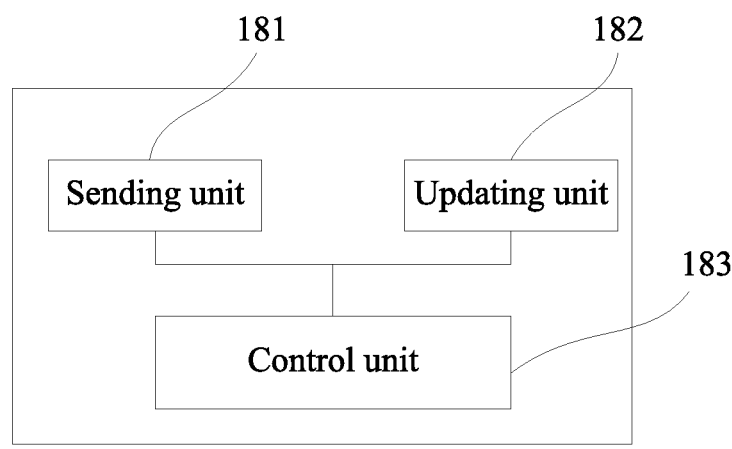
FIG. 18 is a schematic structural diagram of a data transmission device according to Embodiment 8 of the present application.

Specifically, when a sending period starts, updating may be started based on the data volume threshold, and each time one acknowledgement packet is sent, a data volume that is reflected by the acknowledgement packet as being acknowledged by a data receiving end is decremented, and when the data volume is decremented to zero or close to zero, sending an acknowledgement packet within the sending period is stopped. Further refer to FIG. 18, which is a schematic structural diagram of a data transmission device according to Embodiment 8 of the present application. As shown in FIG. 18, the device includes a sending unit 181, an updating unit 182, and a control unit 183, where the sending unit 181 is configured to send an acknowledgement packet; the updating unit 182 is configured to update a total data volume that is reflected by all sent acknowledgement packets within a current sending period as having been acknowledged by a data receiving end; and the control unit 183 is configured to compare the updated total data volume with the data volume threshold, and control, according to a result of the comparison, whether to continue to send an acknowledgement packet within the current sending period.

A description of the data volume threshold is the same as described in Embodiment 1, and is not described herein again.

Moreover, a process of the updating by the updating unit 182 and a process of the controlling by the control unit 183 are the same as described in Embodiment 1, and are not described herein again.

The acknowledgement packet in the embodiments of the present application may be an uplink acknowledgement packet, where uplink means a direction from a terminal device to a base station, or a direction from a terminal device to a radio network controller (RNC for short), or a direction from a terminal device to a server, or the like.

An embodiment of the present application provides a method for processing an acknowledgement packet. As shown in FIG. 1, the method includes the following steps:

100. A new acknowledgement packet arrives.

101. A first entity determines whether another acknowledgement packet or other acknowledgement packets are already buffered, and if another acknowledgement packet or other acknowledgement packets are already buffered, perform step 102; otherwise, perform one of step 103 to step 105 according to different cases.

102. Buffer the new acknowledgement packet, and send the new acknowledgement packet after the another acknowledgement packet or other acknowledgement packets are sent.

103. If a timer of the first entity is not started, start the timer, and send the new acknowledgement packet.

104. If a timer of the first entity is already started and a sending sequence number (SendSeq) is greater than an acknowledgement packet sending threshold, buffer the new acknowledgement packet, restart the timer, and send the new acknowledgement packet before the timer times out.

105. If a timer of the first entity is already started and a sending sequence number (SendSeq) is less than or equal to an acknowledgement packet sending threshold, send the new acknowledgement packet.

The SendSeq is a total data volume of acknowledgement packets that are sent by the first entity after the timer is started, and the acknowledgement packet sending threshold is a total data volume of acknowledgement packets that are allowed to be sent by the first entity within a duration of the timer.

Optionally, when the timer is started or restarted, a value of the SendSeq is 0; and after the new acknowledgement packet is sent, the method further includes: updating the SendSeq.

For example, if another acknowledgement packet or other acknowledgement packets are already buffered, the buffering the new acknowledgement packet includes: buffering the new acknowledgement packet subsequent to the another acknowledgement packet or other acknowledgement packets; and the sending the new acknowledgement packet after the another acknowledgement packet or other acknowledgement packets are sent includes: when the timer of the first entity times out, sending, one by one according to a queue sequence, acknowledgement packets in the buffer.

Optionally, after step 102, the method further includes: updating the Sendseq each time one acknowledgement packet is sent.

Optionally, after step 102, the method further includes: each time the Sendseq is updated, determining whether the updated Sendseq is greater than the acknowledgement packet sending threshold; and if, before the new acknowledgement packet is sent, the updated Sendseq is greater than the acknowledgement packet sending threshold, stopping sending the acknowledgement packets already buffered in the first entity, restarting the timer, and sending the new acknowledgement packet before the timer times out.

For example, when the Sendseq is updated, a relationship between the updated SendSeq and the SendSeq before updating is: updated SendSeq=SendSeq before updating+ Max (0, acknowledgement packet sequence number of a first acknowledgement packet−acknowledgement packet sequence number of a second acknowledgement packet), where the first acknowledgement packet and the second acknowledgement packet are two acknowledgement packets consecutively sent by the first entity.

Further, after the SendSeq is updated, the method further includes: updating an acknowledgement packet sequence number of an acknowledgement packet, where when the acknowledgement packet sequence number of the second acknowledgement packet is updated, if the acknowledgement packet sequence number of the first acknowledgement packet is greater than the acknowledgement packet sequence number of the second acknowledgement packet, or a difference between the sequence number of the first acknowledgement packet and the acknowledgement packet sequence number of the second acknowledgement packet is less than −2147483648, the acknowledgement packet sequence number of the first acknowledgement packet is used as the acknowledgement packet sequence number of the second acknowledgement packet; otherwise, the acknowledgement packet sequence number of the second acknowledgement packet which is read by the first entity is used as the acknowledgement packet sequence number of the second acknowledgement packet.

A value of the acknowledgement packet sending threshold is a product of an average sending byte speed (AvgSendByte) and the duration of the timer, and the AvgSendByte is determined according to an aggregate maximum bit rate (AMBR) and a maximum throughput (MaxThroughput), where:

when the MaxThroughput is 0, AvgSendByte=$\lfloor 0.97 \times AMBR \div 8000 \rfloor$, where a symbol $\lfloor \ \rfloor$ indicates rounding down to a nearest integer; and when the MaxThroughput is not 0, AvgSendByte=$\lfloor \min(\text{MaxThroughput}, \text{AMBR}) \times 0.97 \div 8000 \rfloor$, where a symbol $\lfloor \ \rfloor$ indicates rounding down to a nearest integer.

The duration of the timer is a period within which the first entity sends an acknowledgement packet, where the acknowledgement packet is an uplink packet that is not greater than 80 bytes and includes an acknowledgement character.

Further, when a new acknowledgement packet arrives, if the first entity used for buffering and sending the new acknowledgement packet does not exist, the method further includes: creating the first entity, where the first entity is located in a base station.

Optionally, the first entity in this embodiment may be a base station, such as a NodeB, an eNodeB, an HNodeB, or an HeNodeB, or may be an RNC.

Compared with the prior art, in this embodiment of the present application, after a first entity receives an acknowledgement packet, the acknowledgement packet can be processed, a sending period and a sending data volume threshold can be set for acknowledgement packets, a total data volume of acknowledgement packets that are sent to a server within each sending period can be controlled, and further the quantity of the acknowledgement packets can be controlled. In this way, acknowledgement packets can be sent at a steady rate to the server, thereby avoiding a problem of downlink packets not being transmitted in time and a problem of packet loss due to a sudden increase in the quantity of acknowledgement packets, and further avoiding a decline in network throughput and improving network transmission efficiency.

Figure 2:
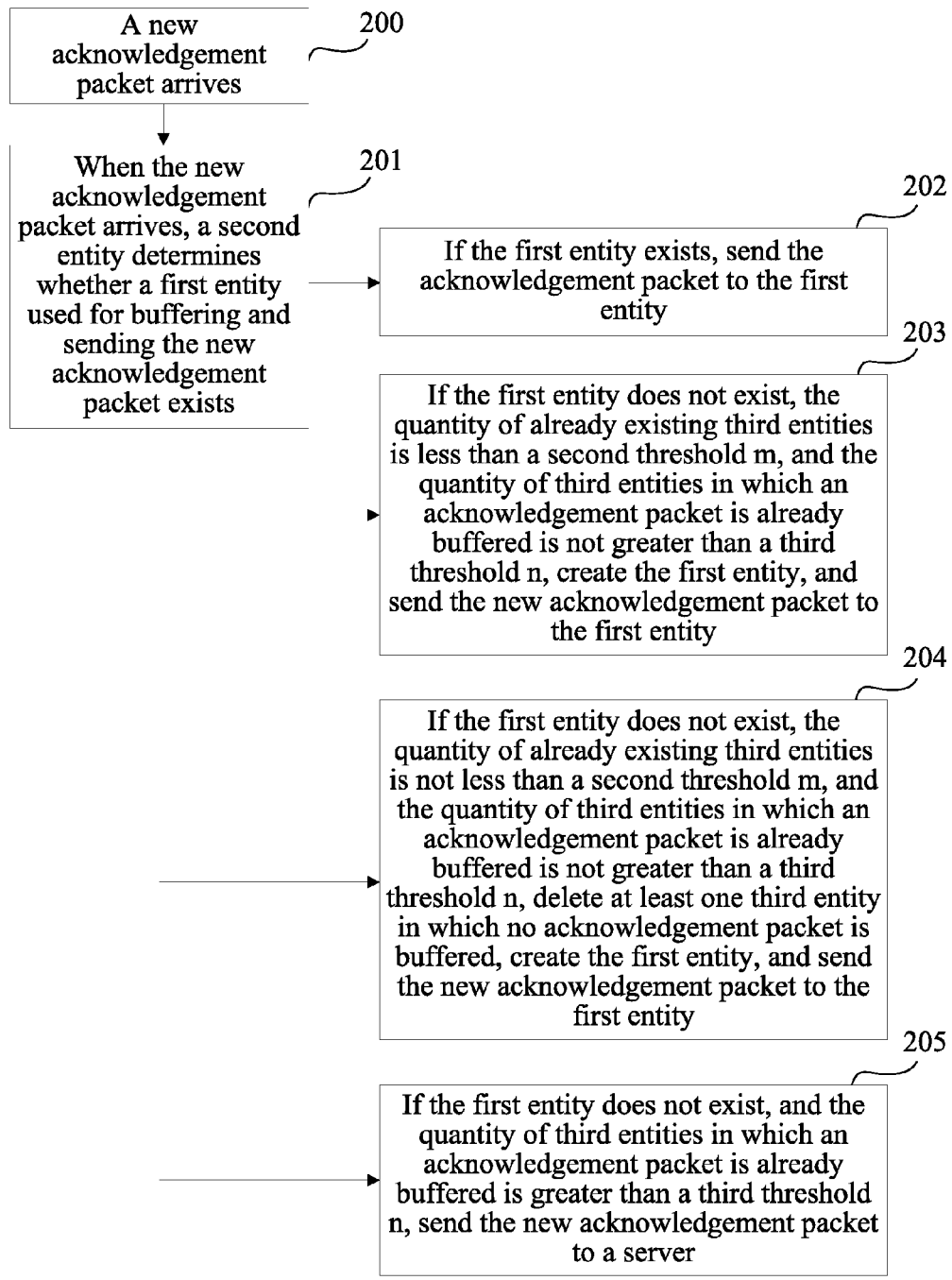
FIG. 2 is a flowchart of a method for processing an acknowledgement packet according to another embodiment of the present application.

Another embodiment of the present application provides a method for processing an acknowledgement packet. As shown in FIG. 2, the method includes the following steps:

200. A new acknowledgement packet arrives.

201. A second entity determines whether a first entity used for buffering and sending the new acknowledgement packet exists, and if the first entity exists, perform step 202; otherwise, perform one of step 203 to step 205 according to different cases.

202. Send the acknowledgement packet to the first entity.

203. If the first entity does not exist, the quantity of already existing third entities is less than a second threshold m, and the quantity of third entities in which an acknowledgement packet is already buffered is not greater than a third threshold n, create the first entity, and send the new acknowledgement packet to the first entity.

204. If the first entity does not exist, the quantity of already existing third entities is not less than a second threshold m, and the quantity of third entities in which an acknowledgement packet is already buffered is not greater than a third threshold n, delete at least one third entity in which no acknowledgement packet is buffered, create the first entity, and send the new acknowledgement packet to the first entity.

205. If the first entity does not exist, and the quantity of third entities in which an acknowledgement packet is already buffered is greater than a third threshold n, send the new acknowledgement packet to a server.

The m is an upper limit on the quantity of entities that are allowed to be created and used for buffering and sending an acknowledgement packet, and the n is an upper limit on the quantity of third quantities that are allowed to buffer an acknowledgement packet simultaneously.

Optionally, the first entity in this embodiment may be a base station, such as a NodeB, an eNodeB, an HNodeB, or an HeNodeB, or may be an RNC.

Compared with the prior art, in this embodiment of the present application, when a new acknowledgement packet arrives at a second entity, the second entity sets, for the new acknowledgement packet, a first entity that determines a processing manner such as buffering and/or sending for the newly arrived acknowledgement packet; the first entity processes acknowledgement packets so as to enable the acknowledgement packets to be sent at a steady rate to the server, thereby avoiding a problem of downlink packets not being transmitted in time and a problem of packet loss due to a sudden increase in the quantity of acknowledgement packets, and further avoiding a decline in network throughput and improving network transmission efficiency.

Figure 3:
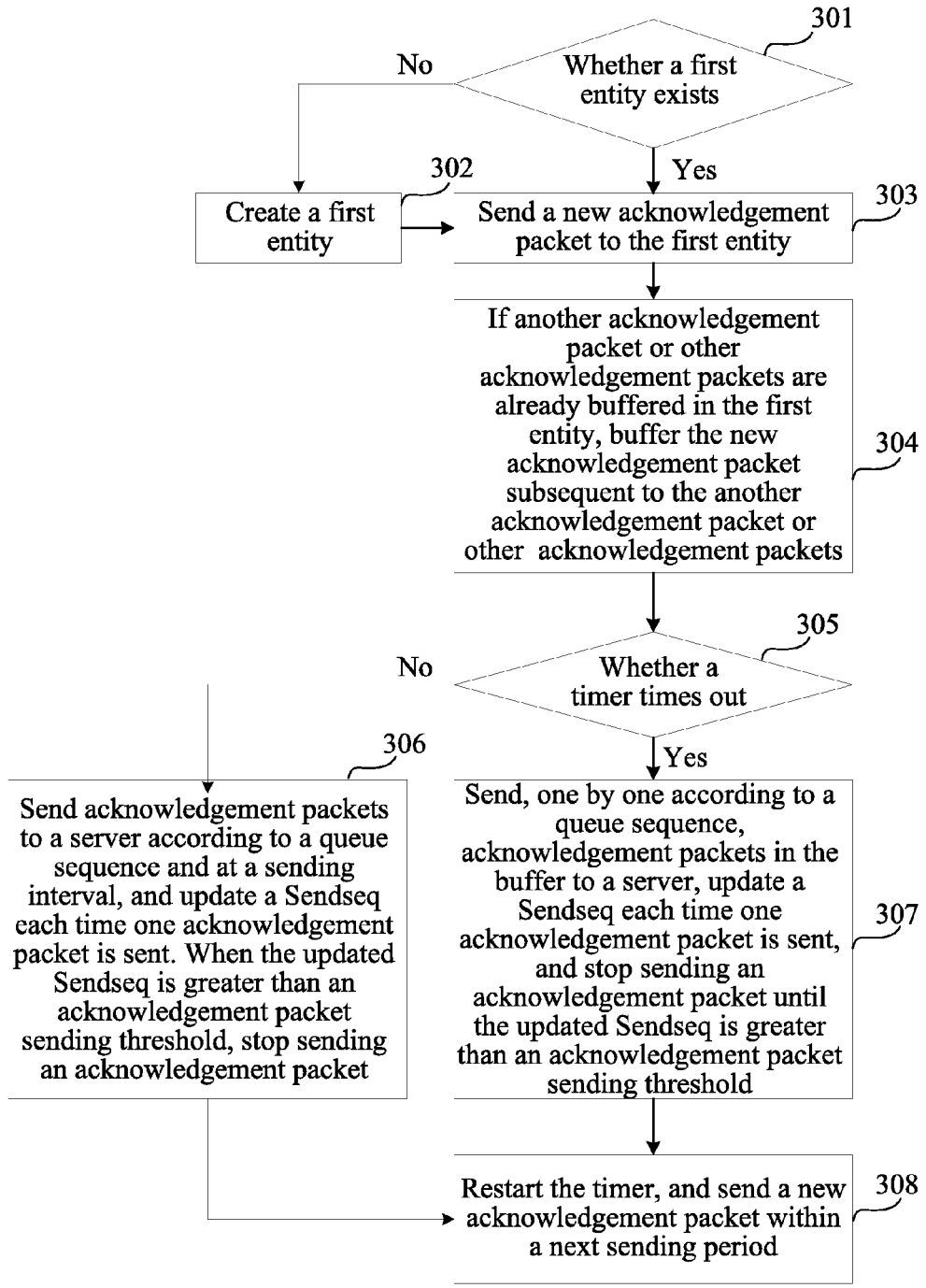
FIG. 3 is a flowchart of a method for processing an acknowledgement packet according to another embodiment of the present application.

Another embodiment of the present application provides a method for processing an acknowledgement packet, and details of this embodiment may be construed as an example for the previous two embodiments. As shown in FIG. 3, the method includes the following steps.

301. When a new acknowledgement packet arrives, a second entity determines whether a first entity used for buffering and sending the new acknowledgement packet exists, and if the first entity does not exist, perform step 302; if the first entity exists, perform step 303.

The acknowledgement packet should meet three conditions: the packet is in an uplink direction; a size of the packet is not greater than 80 bytes; and the packet includes an acknowledgement character (ACK for short).

The first entity is an operation unit in a base station for processing the acknowledgement packet. Upon creation, the entity has parameters such as a source IP, a destination IP, a source port number, a destination port number, a timer, an acknowledgement packet sequence number, and a sending sequence number (SendSeq). A LastSeq indicates a sequence number of an acknowledgement packet that is previously sent, a SendSeq is a total data volume of acknowledgement packets that are sent by the first entity after the timer is started. During initialization, both the acknowledgement packet sequence number and the SendSeq are 0.

302. The second entity creates the corresponding first entity for the new acknowledgement packet.

Optionally, the method further includes: if the first entity does not exist, the quantity of already existing third entities is less than a second threshold m, and the quantity of third entities in which an acknowledgement packet is already buffered is not greater than a third threshold n, creating the first entity, and sending the new acknowledgement packet to the first entity; and if the first entity does not exist, the quantity of already existing third entities is not less than a second threshold m, and the quantity of third entities in which an acknowledgement packet is already buffered is not greater than a third threshold n, deleting at least one third entity in which no acknowledgement packet is buffered, creating the first entity, and sending the new acknowledgement packet to the first entity.

Optionally, the method further includes: if the first entity does not exist, and the quantity of third entities in which an acknowledgement packet is already buffered is greater than a third threshold n, sending the new acknowledgement packet to a server.

The m is an upper limit on the quantity of entities that are allowed to be created and used for buffering and sending an acknowledgement packet, and the n is an upper limit on the quantity of third quantities that are allowed to buffer an acknowledgement packet simultaneously.

303. The second entity sends the new acknowledgement packet to the first entity.

304. When the new acknowledgement packet arrives, if another acknowledgement packet or other acknowledgement packets are already buffered in the first entity, buffer the new acknowledgement packet subsequent to the another acknowledgement packet or other acknowledgement packets.

305. The first entity determines whether the timer times out, and if the timer times out, perform step 307; if the timer does not time out, perform step 306.

A duration of the timer is a period in which the first entity sends an acknowledgement packet.

306. The first entity sends acknowledgement packets to the server according to a queue sequence and at a sending interval, and updates the Sendseq each time one acknowledgement packet is sent; when the updated Sendseq is greater than an acknowledgement packet sending threshold, stops sending an acknowledgement packet, and skips to step 308.

The SendSeq is a total data volume of acknowledgement packets that are sent by the first entity after the timer is started, and the acknowledgement packet sending threshold is a total data volume of acknowledgement packets that are allowed to be sent by the first entity within the duration of the timer. A value of the acknowledgement packet sending threshold is a product of an average sending byte speed (AvgSendByte) and the duration of the timer, and the AvgSendByte is determined according to an aggregate maximum bit rate (AMBR) and a maximum throughput (MaxThroughput), where:

when the MaxThroughput is 0, AvgSendByte=$\lfloor 0.97 \times AMBR \div 8000 \rfloor$, where a symbol $\lfloor \ \rfloor$ indicates rounding down to a nearest integer; and when the MaxThroughput is not 0, AvgSendByte=$\lfloor \min(MaxThroughput, AMBR) \times 0.97 \div 8000 \rfloor$, where a symbol $\lfloor \ \rfloor$ indicates rounding down to a nearest integer.

Specifically, when the Sendseq is updated, a relationship between the updated SendSeq and the SendSeq before updating is: updated SendSeq=SendSeq before updating+ Max (0, acknowledgement packet sequence number of a first acknowledgement packet−acknowledgement packet sequence number of a second acknowledgement packet), where the first acknowledgement packet and the second acknowledgement packet are two acknowledgement packets consecutively sent by the first entity.

Optionally, after the SendSeq is updated, an acknowledgement packet sequence number of an acknowledgement packet should be updated correspondingly, where when the acknowledgement packet sequence number of the second acknowledgement packet is updated, if the acknowledgement packet sequence number of the first acknowledgement packet is greater than the acknowledgement packet sequence number of the second acknowledgement packet, or a difference between the sequence number of the first acknowledgement packet and the acknowledgement packet sequence number of the second acknowledgement packet is less than −2147483648, the acknowledgement packet sequence number of the first acknowledgement packet is used as the acknowledgement packet sequence number of the second acknowledgement packet; otherwise, the acknowledgement packet sequence number of the second acknowledgement packet read by the first entity is used as the acknowledgement packet sequence number of the second acknowledgement packet.

307. The first entity sends acknowledgement packets in the buffer to the server one by one according to a queue sequence, updates the Sendseq each time one acknowledgement packet is sent, and stops sending an acknowledgement packet until the updated Sendseq is greater than the acknowledgement packet sending threshold.

308. The first entity restarts the timer, and sends a new acknowledgement packet within a next sending period.

It should be noted that the first entity, the second entity, and the third entity in this embodiment may all be located in a base station.

Compared with the prior art, in this embodiment of the present application, when a new acknowledgement packet arrives, a second entity searches for or creates a first entity, sends the new acknowledgement packet to the first entity, and the first entity buffers the new acknowledgement packet subsequent to the another acknowledgement packet or other acknowledgement packets and sends the new acknowledgement packet, and at the same time, sets a sending period and a sending data volume threshold for acknowledgement packets, controls a total data volume of acknowledgement packets that are sent to the server within each sending period, and further controls the quantity of the acknowledgement packets. In this way, acknowledgement packets can be sent at a steady rate to the server, thereby avoiding a problem of downlink packets not being transmitted in time and a problem of packet loss due to a sudden increase in the quantity of acknowledgement packets, and further avoiding a decline in network throughput and improving network transmission efficiency.

Figure 4:
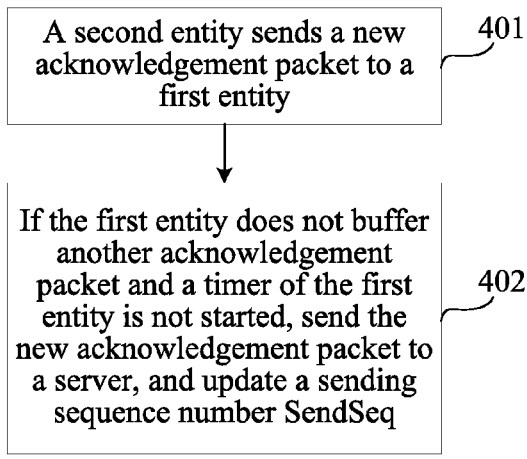
FIG. 4 is a flowchart of a method for processing an acknowledgement packet according to another embodiment of the present application.

Another embodiment of the present application provides a method for processing an acknowledgement packet. A difference between this embodiment and the previous embodiment lies in that when a new acknowledgement packet arrives at a first entity, the first entity does not buffer another acknowledgement packet, and does not start a timer. As shown in FIG. 4, the method includes the following steps:

401. A second entity sends a new acknowledgement packet to the first entity.

For a process of searching for and creating the first entity, refer to step 301 to step 302 in the previous embodiment.

402. When the new acknowledgement packet arrives, if the first entity does not buffer another acknowledgement packet and a timer of the first entity is not started, the first entity sends the new acknowledgement packet to a server, and updates a sending sequence number (SendSeq).

A duration of the timer is a period in which the first entity sends an acknowledgement packet, and the SendSeq is a total data volume of acknowledgement packets that are sent by the first entity after the timer is started. Specifically, when the Sendseq is updated, a relationship between the updated SendSeq and the SendSeq before updating is: updated SendSeq=SendSeq before updating+Max (0, acknowledgement packet sequence number of a first acknowledgement packet−acknowledgement packet sequence number of a second acknowledgement packet), where the first acknowledgement packet and the second acknowledgement packet are two acknowledgement packets consecutively sent by the first entity.

Optionally, after the SendSeq is updated, an acknowledgement packet sequence number of an acknowledgement packet should be updated correspondingly, where when the acknowledgement packet sequence number of the second acknowledgement packet is updated, if the acknowledgement packet sequence number of the first acknowledgement packet is greater than the acknowledgement packet sequence number of the second acknowledgement packet, or a difference between the sequence number of the first acknowledgement packet and the acknowledgement packet sequence number of the second acknowledgement packet is less than −2147483648, the acknowledgement packet sequence number of the first acknowledgement packet is used as the acknowledgement packet sequence number of the second acknowledgement packet; otherwise, the acknowledgement packet sequence number of the second acknowledgement packet read by the first entity is used as the acknowledgement packet sequence number of the second acknowledgement packet.

It should be noted that the first entity, the second entity, and a third entity in this embodiment may all be located in a base station.

Compared with the prior art, in this embodiment of the present application, when a new acknowledgement packet arrives, a second entity searches for or creates a first entity, and sends the new acknowledgement packet to the first entity, and when the first entity does not buffer another acknowledgement packet and does not start a timer, the first entity starts the timer for the new acknowledgement packet, sends the new acknowledgement packet to the server, and at the same time, sets a sending period and a sending data volume threshold for acknowledgement packets, controls a total data volume of acknowledgement packets that are sent to the server within each sending period, and further controls the quantity of the acknowledgement packets. In this way, acknowledgement packets can be sent at a steady rate to the server, thereby avoiding a problem of downlink packets not being transmitted in time and a problem of packet loss due to a sudden increase in the quantity of acknowledgement packets, and further avoiding a decline in network throughput and improving network transmission efficiency.

Figure 5:
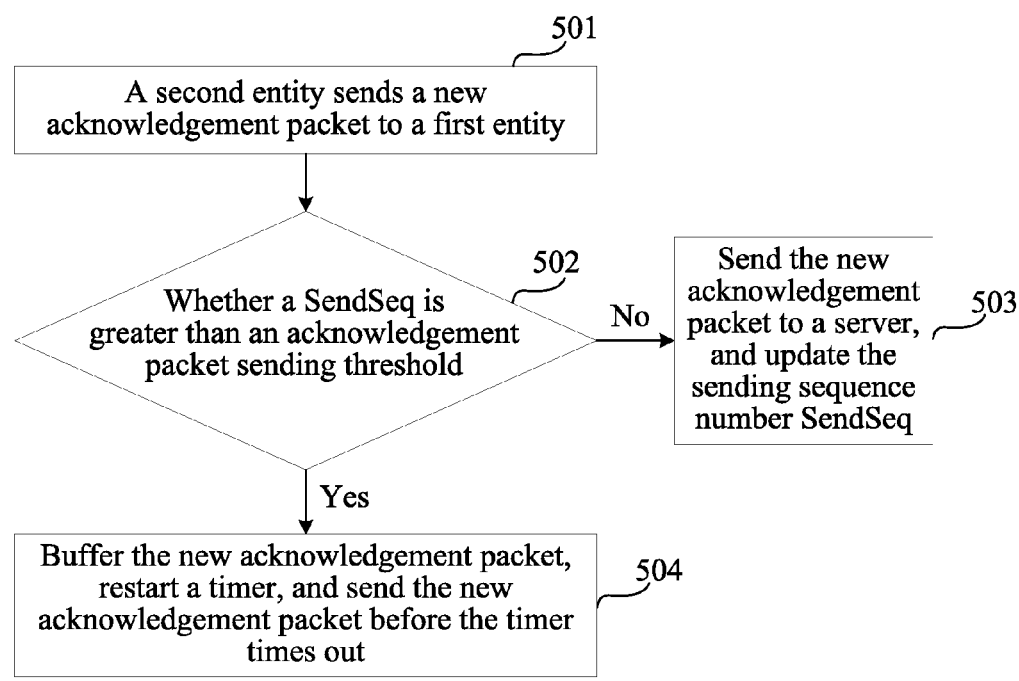
FIG. 5 is a flowchart of a method for processing an acknowledgement packet according to another embodiment of the present application.

Another embodiment of the present application provides a method for processing an acknowledgement packet. A difference between this embodiment and the previous two embodiments lies in that when a new acknowledgement packet arrives at a first entity, the first entity does not buffer another acknowledgement packet, and a timer is already started. As shown in FIG. 5, the method includes the following steps.

501. A second entity sends a new acknowledgement packet to the first entity.

For a process of searching for and creating the first entity, refer to step 301 to step 302 in the third embodiment.

502. When the new acknowledgement packet arrives, if the first entity does not buffer another acknowledgement packet and a timer of the first entity is already started, the first entity determines whether a sending sequence number (SendSeq) is greater than an acknowledgement packet sending threshold; if the SendSeq is greater than the acknowledgement packet sending threshold, perform step 504; if the SendSeq is not greater than the acknowledgement packet sending threshold, perform step 503.

The SendSeq is a total data volume of acknowledgement packets that are sent by the first entity after the timer is started, the acknowledgement packet sending threshold is a total data volume of acknowledgement packets that are allowed to be sent by the first entity within a duration of the timer, and the duration of the timer is a period in which the first entity sends an acknowledgement packet.

For example, a value of the acknowledgement packet sending threshold is a product of an average sending byte speed (AvgSendByte) and the duration of the timer, and the AvgSendByte is determined according to an aggregate maximum bit rate (AMBR) and a maximum throughput (MaxThroughput), where:

when the MaxThroughput is 0, AvgSendByte=$\lfloor 0.97\times$ AMBR÷8000$\rfloor$, where a symbol $\lfloor\ \rfloor$ indicates rounding down to a nearest integer; and when the MaxThroughput is not 0, AvgSendByte=$\lfloor$min (MaxThroughput, AMBR)× 0.97÷8000 $\rfloor$, where a symbol $\lfloor\ \rfloor$ indicates rounding down to a nearest integer.

503. The first entity sends the new acknowledgement packet to a server, and updates the sending sequence number (SendSeq).

Optionally, if the updated SendSeq is greater than a sending threshold, sending a subsequent acknowledgement packet is stopped.

For example, updated SendSeq=SendSeq before updating+Max (0, acknowledgement packet sequence number of a first acknowledgement packet−acknowledgement packet sequence number of a second acknowledgement packet), where the first acknowledgement packet and the second acknowledgement packet are two acknowledgement packets consecutively sent by the first entity.

Optionally, after the SendSeq is updated, a locally stored acknowledgement packet sequence number of an acknowledgement packet should be updated correspondingly, where when the acknowledgement packet sequence number of the second acknowledgement packet is updated, if the acknowledgement packet sequence number of the first acknowledgement packet is greater than the acknowledgement packet sequence number of the second acknowledgement packet, or a difference between the sequence number of the first acknowledgement packet and the acknowledgement packet sequence number of the second acknowledgement packet is less than −2147483648, the acknowledgement packet sequence number of the first acknowledgement packet replaces the acknowledgement packet sequence number of the second acknowledgement packet as the locally stored acknowledgement packet sequence number; otherwise, the acknowledgement packet sequence number of the second acknowledgement packet read by the first entity replaces the acknowledgement packet sequence number of the second acknowledgement packet as the locally stored acknowledgement packet sequence number.

504. The first entity buffers the new acknowledgement packet, restarts the timer, and sends the new acknowledgement packet before the timer times out.

It should be noted that the first entity, the second entity, and a third entity in this embodiment may all be located in a base station.

Compared with the prior art, in this embodiment of the present application, when a new acknowledgement packet arrives, a second entity searches for or creates a first entity, and sends the new acknowledgement packet to the first entity, and when the first entity does not buffer another acknowledgement packet and after a timer is already started, the first entity determines whether a current sending sequence number (Sendseq) exceeds a data volume threshold. If the current Sendseq does not exceed the threshold, the first entity sends the new acknowledgement packet immediately. If the current Sendseq exceeds the threshold, the first entity restarts the timer, and sends the new acknowledgement packet within a next sending period. A total data volume of acknowledgement packets that are sent to the server within each sending period is controlled, and further, the quantity of the acknowledgement packets is controlled, so as to enable the acknowledgement packets to be sent at a steady rate to the server, thereby avoiding a problem of downlink packets not being transmitted in time and a problem of packet loss due to a sudden increase in the quantity of acknowledgement packets, and further avoiding a decline in network throughput and improving network transmission efficiency.

The embodiments of the present application further provide a device for performing the method provided in the foregoing embodiments, and examples are used for description below. For ease of description, optional description, detailed description, and the like involved in the following examples are not provided in detail, and reference may be made to the examples in the foregoing method embodiments.

Figure 6:
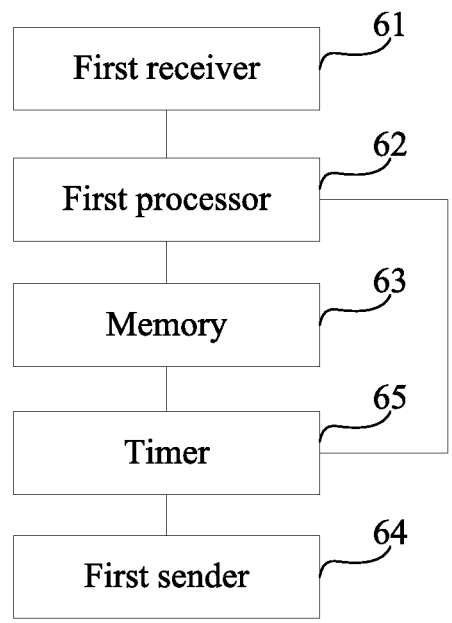
FIG. 6 is a schematic structural diagram of a device for processing an acknowledgement packet according to another embodiment of the present application.

Another embodiment of the present application provides a device for processing an acknowledgement packet. As shown in FIG. 6, the device includes a first receiver 61, a first processor 62, a memory 63, a first sender 64, and a timer 65. The first receiver 61 is configured to receive an acknowledgement packet. The memory 63 is configured to buffer the acknowledgement packet received by the first receiver 61. The first sender 64 is configured to send the acknowledgement packet buffered by the memory 63. The first processor 62 is configured to: when a new acknowledgement packet arrives at the first receiver 61, if determining that another acknowledgement packet or other acknowledgement packets are already buffered in the memory 63, trigger the memory 63 to buffer the new acknowledgement packet, and instruct the first sender 64 to send the new acknowledgement packet after the another acknowledgement packet or other acknowledgement packets are sent; or, when a new acknowledgement packet arrives at the first receiver 61, if determining that the memory 63 does not buffer another acknowledgement packet and the timer 65 is not started, trigger the timer 65 to be started, and trigger the first sender 64 to send the new acknowledgement packet; or, when a new acknowledgement packet arrives at the first receiver 61, if determining that the memory 63 does not buffer another acknowledgement packet, the timer 65 is already started, and a sending sequence number (SendSeq) is greater that an acknowledgement packet sending threshold, trigger the memory 63 to buffer the new acknowledgement packet, trigger the timer 65 to be restarted, and instruct the first sender 64 to send the new acknowledgement packet before the timer 65 times out; or, when a new acknowledgement packet arrives at the first receiver 61, if determining that the memory 63 does not buffer another acknowledgement packet, the timer 65 is already started, and a sending sequence number (SendSeq) is less than or equal to an acknowledgement packet sending threshold, trigger the first sender 64 to send the new acknowledgement packet, where the SendSeq is a total data volume of acknowledgement packets that are sent after the timer 65 is started, and the acknowledgement packet sending threshold is a total data volume of acknowledgement packets that are allowed to be sent within a duration of the timer 65.

Optionally, the first processor 62 is further configured to update the SendSeq after the first sender 64 sends the new acknowledgement packet.

For example, the memory 63 is specifically configured to buffer the new acknowledgement packet subsequent to the another acknowledgement packet or other acknowledgement packets; and the first sender 64 is specifically configured to: when the timer 65 times out, send, one by one according to a queue sequence, the acknowledgement packets buffered in the memory 63.

Optionally, the first processor 62 is further configured to: update the Sendseq each time the first sender 64 sends one acknowledgement packet.

Optionally, the first processor 62 is further configured to: each time the Sendseq is updated, determine whether the updated Sendseq is greater than the acknowledgement packet sending threshold; when the Sendseq updated by the first processor 62 is greater than the acknowledgement packet sending threshold before the first sender 64 sends the new acknowledgement packet, trigger the first sender 64 to stop sending an acknowledgement packet already buffered in the first entity, trigger the timer 65 to be restarted, and instruct the first sender 64 to send the new acknowledgement packet before the timer 65 times out.

Optionally, the first processor 62 is further configured to update an acknowledgement packet sequence number of an acknowledgement packet, where when an acknowledgement packet sequence number of a second acknowledgement packet is updated, if an acknowledgement packet sequence number of a first acknowledgement packet is greater than the acknowledgement packet sequence number of the second acknowledgement packet, or a difference between the sequence number of the first acknowledgement packet and the acknowledgement packet sequence number of the second acknowledgement packet is less than −2147483648, the acknowledgement packet sequence number of the first acknowledgement packet is used as the acknowledgement packet sequence number of the second acknowledgement packet; otherwise, the acknowledgement packet sequence number of the second acknowledgement packet read by the first entity is used as the acknowledgement packet sequence number of the second acknowledgement packet.

The duration of the timer 65 is a period in which an acknowledgement packet is sent.

It should be noted that the device in this embodiment may be a base station, such as a NodeB, an eNodeB, an HNodeB, or an HeNodeB, or may be an RNC.

Compared with the prior art, in this embodiment of the present application, after a first entity receives an acknowledgement packet, the acknowledgement packet can be processed, a sending period and a sending data volume threshold can be set for acknowledgement packets, a total data volume of acknowledgement packets that are sent to a server within each sending period can be controlled, and further the quantity of the acknowledgement packets can be controlled. In this way, acknowledgement packets can be sent at a steady rate to the server, thereby avoiding a problem of downlink packets not being transmitted in time and a problem of packet loss due to a sudden increase in the quantity of acknowledgement packets, and further avoiding a decline in network throughput and improving network transmission efficiency.

Figure 7:
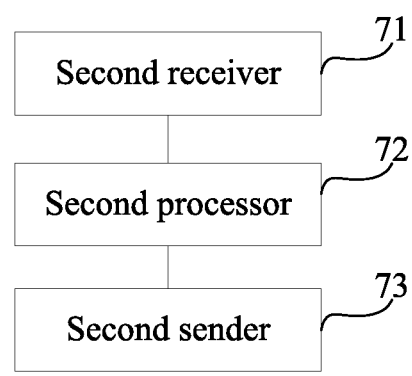
FIG. 7 is a schematic structural diagram of a device for processing an acknowledgement packet according to another embodiment of the present application.

Another embodiment of the present application provides a device for processing an acknowledgement packet. As shown in FIG. 7, the device includes a second receiver 71, a second processor 72, and a second sender 73. The second receiver 71 is configured to receive an acknowledgement packet. The second sender 73 is configured to send, to the first entity, the acknowledgement packet received by the second receiver 71, where the first entity is configured to buffer and send the new acknowledgement packet to a server. The second processor 72 is configured to: when a new acknowledgement packet arrives at the second receiver 71, if determining that the first entity exists, trigger the second sender 73 to send the acknowledgement packet to the first entity; or, when a new acknowledgement packet arrives at the second receiver 71, if determining that the first entity does not exist, the quantity of already existing third entities is less than a second threshold m, and the quantity of third entities in which an acknowledgement packet is already buffered is not greater than a third threshold n, create the first entity, and trigger the second sender 73 to send the new acknowledgement packet to the first entity; or, when a new acknowledgement packet arrives at the second receiver 71, if determining that the first entity does not exist, the quantity of already existing third entities is not less than a second threshold m, and the quantity of third entities in which an acknowledgement packet is already buffered is not greater than a third threshold n, delete at least one third entity in which no acknowledgement packet is buffered, create the first entity, and trigger the second sender 73 to send the new acknowledgement packet to the first entity; or, when a new acknowledgement packet arrives at the second receiver 71, if determining that the first entity does not exist, and the quantity of third entities in which an acknowledgement packet is already buffered is greater than a third threshold n, trigger the second sender 73 to send the new acknowledgement packet to the server, where the m is an upper limit on the quantity of entities that are allowed to be created and used for buffering and sending an acknowledgement packet, and the n is an upper limit on the quantity of third quantities that are allowed to buffer an acknowledgement packet simultaneously.

It should be noted that the device in this embodiment may be a base station, such as a NodeB, an eNodeB, an HNodeB, or an HeNodeB, or may be an RNC.

Compared with the prior art, in this embodiment of the present application, when a new acknowledgement packet arrives at a second entity, the second entity sets, for the new acknowledgement packet, a first entity that determines a processing manner such as buffering and/or sending for the newly arrived acknowledgement packet; the first entity processes acknowledgement packet so as to enable the acknowledgement packet to be sent at a steady rate to the server, thereby avoiding a problem of downlink packets not being transmitted in time and a problem of packet loss due to a sudden increase in the quantity of acknowledgement packets, and further avoiding a decline in network throughput and improving network transmission efficiency.

The device for processing an acknowledgement packet provided in the embodiments of the present application can implement the method embodiments provided above. For a specific function implementation, refer to the description in the method embodiments, and details are not described herein again. The method and device for processing an acknowledgement packet provided in the embodiments of the present application are applicable to data transmission in TCP transmission service, but are not limited thereto.

An embodiment of the present application further provides a system which may include the device shown in FIG. 6 and/or the device shown in FIG. 7.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include a magnetic disk, an optical disc, a read-only memory (ROM), a random access memory (RAM), or the like.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for processing an acknowledgement packet in a wireless network, wherein the wireless network comprises a data sending end, a data transmission device, and a data receiving end, the data transmission device is configured to transmit data from the data sending end to the data receiving data end, wherein the data sending end is a server and the data receiving end is a terminal or the data sending end is a terminal and the data receiving end is a server, and the method comprises:
   receiving, by the data transmission device, an acknowledgement packet from the data receiving end;
   sending, by the data transmission device, the acknowledgement packet to the data sending end;
   determining, by the data transmission device in response to sending the acknowledgement packet, an updated total data volume that is reflected by all sent acknowledgement packets within a current sending period as having been acknowledged by ft the data receiving end;
   comparing, by the data transmission device, the updated total data volume with a data volume threshold; and
   controlling, by the data transmission device according to a result of the comparing, whether to continue to send an acknowledgement packet to the data sending end within the current sending period.

2. The method according to claim 1, wherein determining the updated total data volume comprises determining the updated total data volume according to an acknowledgement packet sequence number of the acknowledgement packet, wherein when the acknowledgement packet sequence number of the currently sent acknowledgement packet is wrapped, the total data volume remains unchanged.

3. The method according to claim 2, wherein determining the updated total data volume according to an acknowledgement packet sequence number of the acknowledgement packet comprises:
- determining, according to a difference between the acknowledgement packet sequence number of the currently sent acknowledgement packet and an acknowledgement packet sequence number of a previously sent acknowledgement packet, a data volume that is reflected by the currently sent acknowledgement packet as being acknowledged by the data receiving end; and
- updating the total data volume according to the data volume that is reflected by the currently sent acknowledgement packet as being acknowledged by the data receiving end.

4. The method according to claim 1, wherein controlling whether to continue to send an acknowledgement packet within the current sending period comprises:
- when the updated total data volume is greater than the data volume threshold, controlling to stop sending an acknowledgement packet within the current sending period;
- when the updated total data volume is less than the data volume threshold, controlling to continue to send an acknowledgement packet within the current sending period; and
- when the updated total data volume is equal to the data volume threshold, controlling to stop sending or continue to send an acknowledgement packet within the current sending period.

5. The method according to claim 1, wherein the data volume threshold is determined according to a bearer capability of a bearer network.

6. The method according to claim 1, wherein determining the updated total data volume comprises determining the updated total data volume by adding a data volume that is reflected in the sent acknowledgement packet to a prior total data volume.

7. A data transmission device, located in a wireless network, wherein the wireless network comprises a data sending end and a data receiving end, the data transmission device is configured to transmit data from the data sending end to the data receiving data end, the data sending end is a server and the data receiving end is a terminal, or, the data sending end is a terminal and the data receiving end is a server, and the device comprises:
- a receiving circuit, configured to receive an acknowledgement packet from the data receiving end;
- a sending circuit, configured to send an acknowledgement packet to the data sending end;
- a memory, configured to store a data volume threshold; and
- a processor, connected to the receiving circuit, the sending circuit, and the memory, the processor configured to determine an updated total data volume that is reflected by all sent acknowledgement packets within a current sending period as having been acknowledged by the data receiving end, compare the updated total data volume with the data volume threshold, and control, according to a result of the comparison, whether the sending circuit continues to send an acknowledgement packet within the current sending period.

8. The device according to claim 7, wherein the processor is configured to determine the updated total data volume according to an acknowledgement packet sequence number of the acknowledgement packet, wherein when the acknowledgement packet sequence number of the currently sent acknowledgement packet is wrapped, the total data volume remains unchanged.

9. The device according to claim 8, wherein the processor is configured to:
- determine, according to a difference between the acknowledgement packet sequence number of the currently sent acknowledgement packet and an acknowledgement packet sequence number of a previously sent acknowledgement packet, a data volume that is reflected by the currently sent acknowledgement packet as being acknowledged by the data receiving end; and
- update the total data volume according to the data volume that is reflected by the currently sent acknowledgement packet as being acknowledged by the data receiving end.

10. The device according to claim 7, wherein the processor is configured to:
- when the updated total data volume is greater than the data volume threshold, control the sending circuit to stop sending an acknowledgement packet within the current sending period;
- when the updated total data volume is less than the data volume threshold, control the sending circuit to continue to send an acknowledgement packet within the current sending period; and
- when the updated total data volume is equal to the data volume threshold, control the sending circuit to stop sending or continue to send an acknowledgement packet within the current sending period.

11. The device according to claim 7, wherein the data volume threshold is determined according to a bearer capability of a bearer network.

12. The device according to claim 7, wherein the processor is configured to determine the updated total data volume by adding a data volume that is reflected in the sent acknowledgement packet to a prior total data volume.

13. A communications system, comprising a data sending end, a data receiving end, and a data transmission device, wherein the data sending end communicates with the data receiving end through the data transmission device, the data sending end is a server and the data receiving end is a terminal, or, the data sending end is a terminal and the data receiving end is a server, and wherein the data transmission device comprises:
- a receiving circuit, configured to receive an acknowledgement packet from the data receiving end;
- a sending circuit, configured to send an acknowledgement packet to the data sending end;
- a memory, configured to store a data volume threshold; and
- a processor, connected to the receiving circuit, the sending circuit, and the memory, and configured to:
  - in response to sending the acknowledgement packet, determine an updated total data volume that is reflected by all sent acknowledgement packets within a current sending period as having been acknowledged by the data receiving end;
  - compare the updated total data volume with the data volume threshold; and
  - control, according to a result of the comparison, whether the sending circuit continues to send an acknowledgement packet within the current sending period.

14. The system according to claim 13, wherein the processor is configured to determine the updated total data volume according to an acknowledgement packet sequence number of the acknowledgement packet, wherein when the acknowledgment packet sequence number of the currently sent acknowledgement packet is wrapped, the total data volume remains unchanged.

15. The system according to claim 14, wherein the processor is configured to:
  determine, according to a difference between the acknowledgement packet sequence number of the currently sent acknowledgement packet and an acknowledgement packet sequence number of a previously sent acknowledgement packet, a data volume that is reflected by the currently sent acknowledgement packet as being acknowledged by the data receiving end; and
  update the total data volume according to the data volume that is reflected by the currently sent acknowledgement packet as being acknowledged by the data receiving end.

16. The system according to claim 13, wherein the processor is configured to:
  when the updated total data volume is being greater than the data volume threshold, control the sending circuit to stop sending an acknowledgement packet within the current sending period;
  when the updated total data volume is less than the data volume threshold, control the sending circuit to continue to send an acknowledgement packet within the current sending period; and
  when the updated total data volume is equal to the data volume threshold, control the sending circuit to stop sending or continue to send an acknowledgement packet within the current sending period.

17. The system according to claim 13, wherein the data volume threshold is determined according to a bearer capability of a bearer network.

18. The system according to claim 13, wherein the processor is configured to determine the updated total data volume by adding a data volume that is reflected in the sent acknowledgement packet to a prior total data volume.

* * * * *

UNITED STATES PATENT AND TRADEMARK OFFICE
CERTIFICATE OF CORRECTION

| | |
|---|---|
| PATENT NO. | : 9,602,410 B2 |
| APPLICATION NO. | : 14/491744 |
| DATED | : March 21, 2017 |
| INVENTOR(S) | : Changhua Tong |

It is certified that error appears in the above-identified patent and that said Letters Patent is hereby corrected as shown below:

In the Claims

In Column 26, Line 54, Claim 1, delete "by ft the" and insert --by the--.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*